United States Patent
Kosmiskas

(10) Patent No.: US 10,970,904 B1
(45) Date of Patent: Apr. 6, 2021

(54) INTERFACE LAYOUT USING RELATIVE POSITIONING

(71) Applicant: Twitch Interactive, Inc., San Francisco, CA (US)

(72) Inventor: Mario Kosmiskas, San Mateo, CA (US)

(73) Assignee: Twitch Interactive, Inc., San Francisco, CA (US)

( * ) Notice: Subject to any disclaimer, the term of this patent is extended or adjusted under 35 U.S.C. 154(b) by 0 days.

(21) Appl. No.: 16/448,435

(22) Filed: Jun. 21, 2019

(51) Int. Cl.
| | |
|---|---|
| *G06T 11/60* | (2006.01) |
| *G06T 13/80* | (2011.01) |
| *G06F 3/0481* | (2013.01) |
| *H04L 29/06* | (2006.01) |
| *G06F 9/451* | (2018.01) |
| *A63F 13/537* | (2014.01) |
| *G06F 3/147* | (2006.01) |

(52) U.S. Cl.
CPC ............ *G06T 11/60* (2013.01); *A63F 13/537* (2014.09); *G06F 3/0481* (2013.01); *G06F 3/147* (2013.01); *G06F 9/451* (2018.02); *G06T 13/80* (2013.01); *H04L 65/4076* (2013.01); *G06F 2203/04803* (2013.01)

(58) Field of Classification Search
CPC combination set(s) only.
See application file for complete search history.

(56) References Cited

U.S. PATENT DOCUMENTS

| | | | |
|---|---|---|---|
| 6,310,601 B1* | 10/2001 | Moore | G06F 3/14 345/660 |
| 6,442,755 B1 | 8/2002 | Lemmons et al. | |
| 8,022,951 B2* | 9/2011 | Zhirkov | G06T 15/205 345/427 |
| 9,420,027 B1 | 8/2016 | Elsner | |
| 9,973,819 B1 | 5/2018 | Taylor et al. | |
| 10,194,189 B1 | 1/2019 | Goetz et al. | |
| 10,440,436 B1 | 10/2019 | Taylor et al. | |
| 2004/0268299 A1* | 12/2004 | Lei | G06F 9/451 717/106 |
| 2007/0157234 A1 | 7/2007 | Walker | |
| 2007/0157260 A1 | 7/2007 | Walker | |
| 2008/0216153 A1 | 9/2008 | Aaltonen et al. | |

(Continued)

*Primary Examiner* — Motilewa Good Johnson
(74) *Attorney, Agent, or Firm* — BakerHostetler

(57) ABSTRACT

A declarative cross-platform framework for interactive user interfaces is described herein. Commands may define a virtual surface for display in a plurality of streaming applications executing across a plurality of computing platforms. The commands may be expressed in a declarative format that allows the virtual surface to be defined without injecting code into the plurality of streaming applications. The commands may indicate a first position within the virtual surface for display of a display item, and the first position may be expressed based on relative amounts of positional attributes that are relative to total amounts of the positional attributes for the virtual surface in its entirety. The streaming applications may host framework runtime components for respective computing platforms on which the streaming applications execute. The framework runtime components may use the commands to generate respective rendering instructions for rendering the virtual surface on their respective computing platforms.

17 Claims, 17 Drawing Sheets

(56) References Cited

U.S. PATENT DOCUMENTS

| | | |
|---|---|---|
| 2009/0138922 A1 | 5/2009 | Thomas et al. |
| 2009/0158374 A1 | 6/2009 | Malaure et al. |
| 2009/0276805 A1 | 11/2009 | Andrews, II et al. |
| 2010/0020104 A1* | 1/2010 | Mitsumata ............... G09G 5/26 345/660 |
| 2010/0257559 A1 | 10/2010 | Friedlander et al. |
| 2010/0321389 A1 | 12/2010 | Gay et al. |
| 2011/0069940 A1 | 3/2011 | Shimy et al. |
| 2013/0047150 A1 | 2/2013 | Malasky et al. |
| 2013/0173765 A1 | 7/2013 | Korbecki |
| 2014/0035945 A1 | 2/2014 | Anglin et al. |
| 2014/0210714 A1 | 7/2014 | Kang et al. |
| 2015/0382052 A1 | 12/2015 | Pearlman et al. |
| 2016/0012053 A1* | 1/2016 | Weening ............... G06F 16/435 707/723 |
| 2016/0217110 A1* | 7/2016 | Parag ................... G06F 3/04842 |
| 2016/0342312 A1* | 11/2016 | Jiang ................... G06F 3/04845 |
| 2016/0357358 A1* | 12/2016 | Forster .................. G06F 3/0416 |
| 2016/0381427 A1 | 12/2016 | Taylor et al. |
| 2017/0006322 A1 | 1/2017 | Dury et al. |
| 2017/0180793 A1 | 6/2017 | Cremer et al. |
| 2017/0180795 A1 | 6/2017 | Cremer et al. |
| 2017/0337321 A1* | 11/2017 | Hoford ................. G06F 40/106 |
| 2018/0121028 A1* | 5/2018 | Kuscher ............. G06F 3/04817 |
| 2018/0176272 A1 | 6/2018 | Zur et al. |
| 2018/0295424 A1 | 10/2018 | Taylor et al. |
| 2020/0004954 A1 | 1/2020 | Zawadowskiy et al. |

* cited by examiner

| Composite Widget Instantiation 530 |
|---|

```
"product": {
        "id": "Coffee30",
        "image": "https://....jpg",
        "description": "Premium Roast Ground Coffee, 30 Ounce",
        "rating": "4.5",
        "reviews": "96",
        "price": "$8.94"
}
```

FIG. 6

```
Composite Widget Definition 520 (Part One)
{
  "surface": "panel",
  "name": "product",
  "type": "widget",
  "content": [
    {
      "horizontal": {
        "guides": ["30"],
        "alignment": "center",
        "background-color": "FFFFFF",
        "content": [
          {
            "image": {
              "#define": {
                "name": "image",
                "property": "url"
              }
            }
          },
          {
            "vertical": {
              "alignment": "fill",
              "content": [
                {
                  "text": {
                    "#define": {
                      "name": "description",
                      "property": "value"
                    },
                    "lines": "2"
                  }
                },
                {
                  "horizontal": {
                    "alignment": "fill",
                    "guides": ["70", "1"],
                    "content": [
                      {
                        "starsRating": {
                          "#define": [
                            {
                              "name": "rating",
                              "property": "value"
                            }
                          ]
                        }
                      },
                      {
                        "space": {
                          "size": "1x1"
                        }
                      },
```

FIG. 7A

```
Composite Widget Definition 520 (Part Two)

{
                "text": {
                  "#define": [
                    {
                       "name": "reviews",
                       "property": "value"
                    }
                  ],
                  "color": "008296"
                }
              }
            ]
          }
        },
        {
          "text": {
            "#define": {
              "name": "price",
              "property": "value"
            },
            "color": "7D5BBE"
          }
        }
      ]
    }
  }
 ]
}
```

FIG. 7B

```
Animation Command 900

[{
  "type": "exec",
  "overlay": [
    { "anim": {
        "id": "anim1",
        "duration": "4.8",
        "path": [
          { "start": "0x0.5*h" },
          { "line": "0.5*wx0.5*h" },
          { "repeat": { "times": "9",
              "path": [ { "start": "0.5*wx0.5*h+30" }, { "line": "0.5*wx0.5*h-30" } ] } },
          { "line": "0.5*wx0.5*h" } ] } },
    { "add": [ {
        "target": "#surface",
        "widgets": { "text": { "id": "widget1", "value": "Wow!!!" } } } ] },
    { "run": {
        "widget": "widget1",
        "anim": "anim1",
        "done": [ { "del": "widget1" } ] } }
  ]
}]
```

FIG. 9

1410 Receive one or more commands indicating a first position within a virtual surface for display of a display item, the first position expressed based at least in part on a first relative amount of a first positional attribute that is relative to a first total amount of the first positional attribute for the virtual surface in its entirety (and optionally further based in part on other relative amounts for other positional attributes)

1412 Generate rendering instructions for rendering the virtual surface including the display item in a user interface of a streaming application

1414 Provide the rendering instructions to one or more rendering components that render the virtual surface including the display item in the user interface based on the first instructions, wherein the display item is displayed at the first position

FIG. 14

INTERFACE LAYOUT USING RELATIVE POSITIONING

CROSS-REFERENCE TO RELATED APPLICATIONS

This application is related to the following application, which is hereby incorporated by reference in its entirety: U.S. patent application Ser. No. 16/448,310 filed Jun. 21, 2019, entitled "DECLARATIVE CROSS-PLATFORM FRAMEWORK FOR INTERACTIVE USER INTERFACES".

BACKGROUND

The widespread use of video streaming has increased rapidly in recent years. A streamer, as used herein, refers to a user that provides video content that is streamed to viewers. In some examples, a streamer may capture video content and transmit the video content to a video streaming service. The video streaming service may then, in turn, transmit the video to a number of viewers. In one specific example, a streamer may be a video game player that captures and transmits video of a game that he or she is playing. In some examples, the video content may be transmitted to viewers and played using live streaming techniques. For example, content video of an event (e.g., video game) may be transmitted to viewers, and at least part of the video content may be played while the event is still occurring (e.g., while the video game is still being played by the streamer), albeit with some small amounts latency between the time that video content is captured by the provider and the time that the video is eventually played to viewers. In some examples, streaming video content may be played on many devices spanning across a variety of different computing platforms, such as computing platforms associated with different operating systems, computing platforms associated with different types of devices (e.g., gaming consoles, smart televisions, phones and other mobile devices, laptops, desktops, etc.), and/or other computing platforms.

BRIEF DESCRIPTION OF DRAWINGS

The following detailed description may be better understood when read in conjunction with the appended drawings. For the purposes of illustration, there are shown in the drawings example embodiments of various aspects of the disclosure; however, the invention is not limited to the specific methods and instrumentalities disclosed.

FIG. 6 is a diagram illustrating an example composite widget instantiation that may be used in accordance with the present disclosure.

FIGS. 7A-7B are diagrams illustrating an example composite widget definition that may be used in accordance with the present disclosure.

FIG. 9 is a diagram illustrating an example animation command that may be used in accordance with the present disclosure.

FIG. 14 is a flowchart illustrating an example process for rendering a display item using relative positioning that may be used in accordance with the present disclosure.

DETAILED DESCRIPTION

Figure 1:
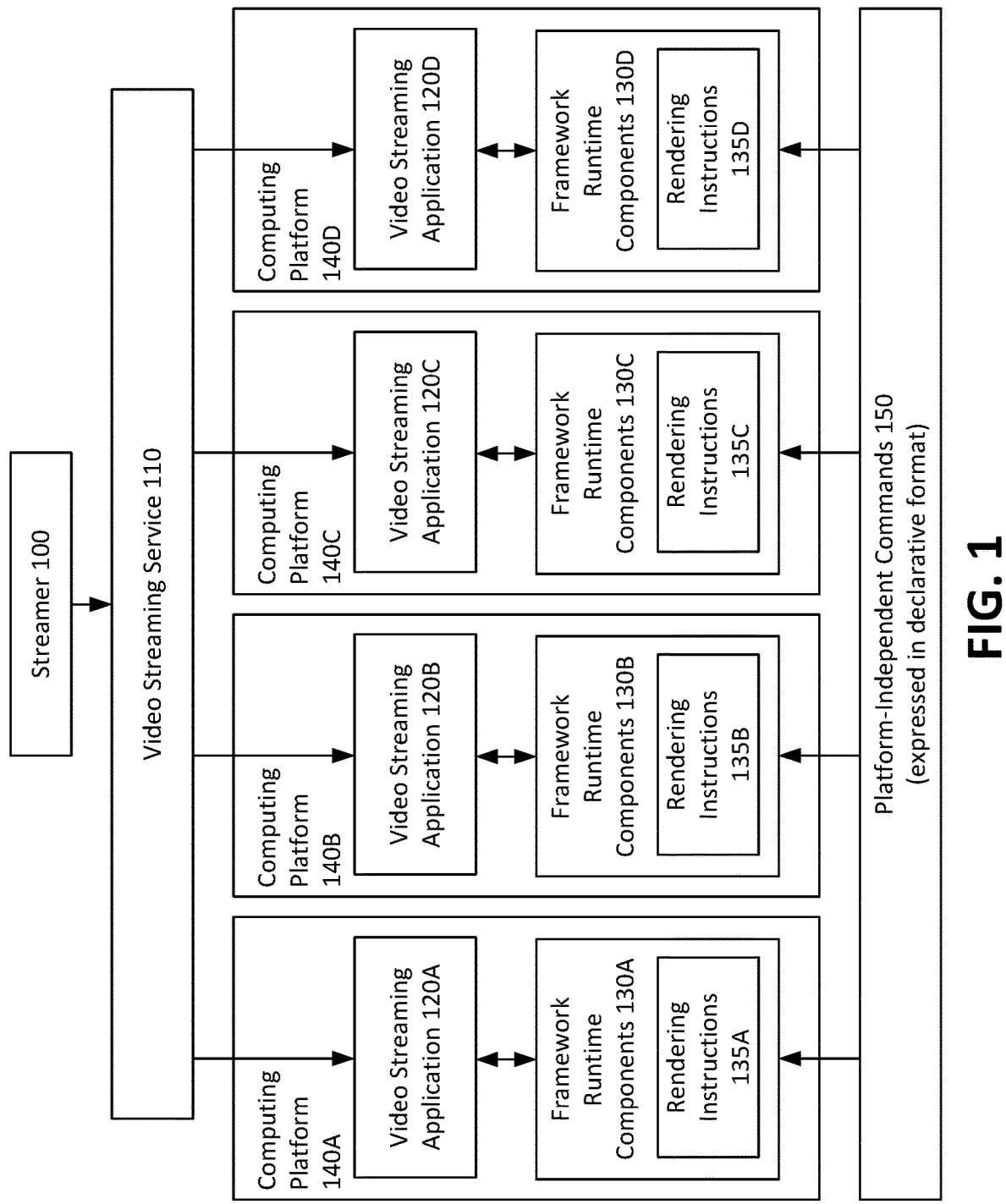
FIG. 1 is a diagram illustrating an example system for implementing a user interface framework that may be used in accordance with the present disclosure.

A declarative cross-platform framework for interactive user interfaces is described herein. In particular, in some examples, a stream of video content, for example corresponding to a video game, may be transmitted to a number of viewers. The video content may be provided by a streamer, which is a user that provides video content that is streamed to viewers. In some examples, the streamer may transmit the video content to a video streaming service. The video streaming service may then, in turn, transmit the video content to a number of viewers. For example, a streamer may be a video game player that captures and transmits video of a game that he or she is playing. The video streaming service may, in turn, transmit the video of the game to a number of viewers. In some examples, the video content may be transmitted to viewers and played using live streaming techniques. For example, video content of an event (e.g., video game) may be transmitted to viewers, and at least part of the video content may be played while the event is still occurring (e.g., while the video game is still being played by the streamer), albeit with some small amounts latency between the time that video content is captured by the provider and the time that the video is eventually played to viewers.

A video streaming application is an application executing on a viewer's device that displays the streamed video content, such as using a video player component. Some examples of a streaming application may include a client application of the video streaming service, a standard web browser, or another type of streaming application. In some examples, the streaming application may provide a streaming application interface that includes a video player interface in which the streaming video is displayed.

In combination with the video content transmitted by the video streaming service, it may be desirable to display additional content to viewers. In some examples, the additional content may include information about the video game or other video content that is being streamed. In some examples, the additional content may include information that is generated, updated and displayed live in real-time or near real-time, such as to reflect current game or other video content states. Also, in some examples, the additional content may be interactive content that allows the viewer to provide input, such as to vote and/or wager on various events, to purchase various products or services, or to provide other types of input. In some cases, the additional content may include text, images, video, graphics, animations, input controls (e.g., buttons, checkboxes, etc.), and the like. Also, in some cases, the additional content may include live statistics, such as player and/or team statistics (e.g., wins, losses, kills, points, rankings, etc.), inventory, location information, timing information, game object information, and other statistics. Furthermore, in some examples, the additional content may include information about a particular feed or channel on which the video content is transmitted. For example, the additional information may include live statistics or other information about viewers of a particular channel and/or subscribers to a particular player's video feed. Many other types of additional content may be provided in combination with a video content stream. In some examples, by enhancing the interactive nature of content that is presented to the viewer, the additional content may improve the viewer's experience and potentially attract new and more devoted viewers. In some examples, the additional content may be provided third parties other than the video streaming service. By allowing third parties to develop and provide additional content, the range of interactions and experiences made available through such content may, in some cases, be significantly expanded. Additionally, the video streaming service may allow video content providers, such as video game players, to select which additional content is to be displayed in combination with their particular provided video content. For example, in some cases, a video content provider may browse available additional content and select particular additional content to embed on a respective channel, page or other interface on which the provider's video content is displayed.

One challenge related to the display of this additional content is that video content may often be played on many devices spanning across a variety of different computing platforms, such as computing platforms associated with different operating systems, computing platforms associated with different types of devices (e.g., gaming consoles, smart televisions, phones and other mobile devices, laptops, desktops, etc.), and/or other computing platforms. In some cases, additional content, such as described above, may be displayed in a respective additional content interface, such as an interface that wholly or partially overlays the video player interface or an interface that is external to the video player interface (e.g., below the video player interface). In some examples, however, the available tools, processes and/or procedures for creation of user interfaces, as well as the structure and behavior of the user interfaces, may vary between different computing platforms. Additionally, in some examples, the layout and characteristics of the streaming applications and displays themselves may vary between different computing platforms, such as the screen size, resolution, position of the video player, the amount of the screen occupied by the video player, the layout of the video player and other screen contents in different display modes (e.g., portrait vs. landscape), and the like. The variation of these and other characteristics may raise the difficulty and complexity of the user interface generation process for display of additional content. Moreover, in some examples, different computing platforms may have different rules related to user interface generation and/or the streaming applications. For example, some computing platforms may have rules that prevent third parties other than developers of the streaming application from generating and injecting code into the streaming application. Such rules may make it difficult or impossible for third parties to employ certain traditional formats for user interface generation, such as hypertext markup language (HTML), JavaScript, and the like.

To alleviate these and other problems, a declarative cross-platform framework for interactive user interfaces is described herein. In some examples, the framework may be implemented based on platform-independent commands that define a virtual surface for display in a plurality of streaming applications executing across a plurality of computing platforms. The formats for these commands may be exposed to third parties by an administrator of the framework, such as a video streaming service. The commands may be expressed in a declarative format that allows the virtual surface to be defined without injecting code into the streaming applications. In one specific example, the commands may be expressed using a language-independent data format, such as JavaScript Object Notation (JSON). In some examples, the commands may give each virtual surface a unique name and may include identifications of one or more display items, such as widgets (e.g., text, images, video, graphics, animations, input controls, etc.), to include in the virtual surface and one or more properties (e.g., size, position, color, visibility, etc.) of each of the one or more display items.

The framework may be implemented using a number of different framework runtime components corresponding to different respective computing platforms on which the framework is employed. The term computing platform, as used herein, refers to any computing hardware and/or software configurations on which an application executes. In one specific example, a first framework runtime component might execute on a first computing platform for a first operating system common to phones and other mobile devices, a second framework runtime component might execute on a second computing platform for a second operating system also common to phones and other mobile devices, a third framework runtime component might execute on a third computing platform for gaming consoles, smart televisions and related devices, and a fourth framework runtime component might execute on a fourth computing platform for web browsers. In some examples, because framework commands may be expressed in a declarative format without code, the runtime components may be executable on a wide variety of host computing devices, even including many of those with limited processing and/or memory capacity. Each framework runtime component may ingest the platform-independent commands that define the virtual surface and use those commands to generate respective rendering instructions for rendering the virtual surface in a user interface of a streaming application. The respective rendering instructions may be platform-specific, such that they are wholly or partially different from one another across different platforms. In some examples, the rendering instructions may employ native user interface toolkits of a respective target platform and/or cross-platform widget libraries for rendering of the virtual surface and its contents. In some examples, the streaming applications may manage the virtual surfaces and register them with the runtime components. The shape, size and positioning of the virtual surfaces may be inconsequential to the framework and may vary between different platforms.

In some examples, dynamic experiences can be created by integrating server-side logic that either reacts to user input or pushes updates asynchronously. For example, in some cases, a display item may have an associated action property that indicates actions to perform in response to user input to the display item in the virtual surface. In some examples, the actions may include opening of a uniform resource locator (URL) or other link, issuing a notification of the user input to the host streaming application, providing a state of one or more other display items when the user input is received, performing a modification of the virtual surface (e.g., adding, removing, or changing a display item in the virtual surface, running an animation, etc.). The indication of these actions in the platform-independent commands may allow for an interactive user experience to be defined using the declarative framework. For example, when a user votes in a poll, the framework may be instructed to provide, to the streaming application, an indication of the vote including a state of a checkbox (e.g., checked or unchecked) along with an indication of the text that is included in the poll. The streaming application may then forward this information to a third party or other entity for processing of the results and any potential follow-up actions.

One way in which a virtual surface and its contents may be rendered across a variety of different computing platforms and devices is by making the layout and positions of display items relative to the virtual surface as a whole. For example, in some cases, platform-independent commands may express a position of a display item based on relative amounts of positional attributes that are relative to total amounts of the positional attributes for the virtual surface as a whole. In some examples, the position attributes may include an X-dimension (or width) and/or a Y-dimension (or height) in an XY coordinate system. Also, in some examples, the relative amounts may be expressed as mathematical functions with respect to the total amounts, such as percentages, ratios, or fractions of the total amounts. For example, a position of a display item may be expressed using a percentage (or other relative amount) of a total width and/or a total height of a virtual surface that includes the display item. In one specific example, a coordinate system may originate from a top left corner of a virtual surface. In this example, to display an item halfway down the left edge of the virtual surface, the position of the item may be expressed as (0.0w)×(0.5h). In this case, the (0.0w) refers to zero width (corresponding to the left edge of the virtual surface), and the (0.5h) refers to half of the height (corresponding to halfway down the virtual surface). As another example, to display an item halfway down the right edge of the virtual surface, the position of the item may be expressed as (1.0w)×(0.5h). In this case, the (1.0w) refers to the total width (corresponding to the right edge of the virtual surface), and the (0.5h) refers to half of the height (corresponding to halfway down the virtual surface).

FIG. 1 is a diagram illustrating an example system for implementing a user interface framework that may be used in accordance with the present disclosure. As shown in FIG. 1, a streamer 100 may be transmit video content to a video streaming service 110, which, in turn, may transmit the video content to video streaming applications 120A-D. The video streaming applications may then play the video content. Each of the video streaming applications 120A-D may execute on a respective client computing device. The video content may be transmitted from streamer 100 to video streaming service 110 and, in turn, from video streaming service 110 to video streaming applications 120A-D over one or more communications networks, for example one or more local area networks (LAN's) and/or one or more wide area networks (WAN's), such as the Internet. Additionally, video content may be transmitted from streamer 100 to video streaming service 110 and, in turn, from video streaming service 110 to video streaming applications 120A-D using streaming transmission techniques, in which portions of transmitted content are received and played while subsequent portions of the transmitted content are being transmitted. A video stream, as used herein, refers to video content that is transmitted using streaming transmission techniques. Video streaming service 110 may include transmission components, such as encoders, edge servers, and the like.

In some examples, the video content may include video of a live event, such as a video game, sporting event, news event, or other live event. In one specific example, streamer 100 may be a video game player and may provide video captured from a video game that he or she is playing. In some examples, the video content may be transmitted along with corresponding audio content, such as video game audio output, which may also be played by the video streaming applications 120A-D. Also, in some examples, the video content may be transmitted to the video streaming applications 120A-D and played using live streaming techniques. For example, video content of an event (e.g., a video game) may be transmitted to the video streaming applications 120A-D, and at least part of the video content may played by the video streaming applications 120A-D while the event is still occurring (e.g., while the video game is still being played by one or more game players), albeit with some small amounts of latency between the time that the video is captured by the streamer 100 and the time that the video is eventually played by the video streaming applications 120A-D. In some examples, streamer 100 may capture video using screen capture software, one or more cameras, and/or other video capture components.

A video streaming application 120A-D is an application executing on a viewer's device that displays the streamed video content, such as using a video player component. As set forth above, some examples of a video streaming application 120A-D may include a client application of the video streaming service 110, a standard web browser, or another type of streaming application. In some examples, a video streaming application 120A-D may provide a streaming application interface that includes a video player interface in which the streaming video is displayed. In the example of FIG. 1, each video streaming application 120A-D executes on a respective computing platform 140A-D. As set forth above, the term computing platform, as used herein, refers to any computing hardware and/or software configurations on which an application executes. In one specific example, computing platform 140A may correspond to a first operating system common to phones and other mobile devices, computing platform 140B may correspond to a second operating system also common to phones and other mobile devices, computing platform 140C may correspond to gaming consoles, smart televisions and related devices, and computing platform 140D may correspond to web browsers. Each of video streaming applications 120A-D may be configured for operation on their respective computing platforms. In a specific example, video streaming applications 120A and 120B may be client applications of the video streaming service 110 that are configured for executing on different operating systems corresponding to computing platforms 140A and 140B, respectively. In another specific example, video streaming application 120C may be an application that is configured for execution on gaming consoles, smart televisions and/or related devices. In another specific example, video streaming application 120D may be a standard web browser.

In the example of FIG. 1, each video streaming application 120A-D hosts execution of a respective framework runtime component 130A-D. Each of the framework runtime components 130A-D may receive platform-independent commands 150 for creating and interacting with user interfaces within the video streaming applications 120A-D. The user interfaces created using the platform-independent commands 150 may be used to display and interact with additional content that relates to the video content streamed from the video streaming service 110. As set forth above, this additional content may include information that is generated, updated and displayed live in real-time or near real-time, such as to reflect current game or other video content states. Also, in some examples, the additional content may be interactive content that allows the viewer to provide input, such as to vote and/or wager on various events, to purchase various products or services, or to provide other types of input. In some cases, the additional content may include text, images, video, graphics, animations, input controls (e.g., buttons, checkboxes, etc.), and the like. Also, in some cases, the additional content may include live statistics, such as player and/or team statistics (e.g., wins, losses, kills, points, rankings, etc.), inventory, location information, timing information, game object information, and other statistics. Furthermore, in some examples, the additional content may include information about a particular feed or channel on which the video content is transmitted. For example, the additional information may include live statistics or other information about viewers of a particular channel and/or subscribers to a particular player's video feed. Many other types of additional content may be provided in combination with a video content stream.

In some examples, each of the framework runtime components 130A-D may receive identical platform-independent commands 150. Thus, in some examples, the platform-independent commands 150 may be common across all computing platforms on which the streamed video content is played. The platform-independent commands 150 may be expressed in a declarative format that allows the virtual surface to be defined without injecting code into the streaming applications. In some examples, because the platform-independent commands 150 may be expressed in a declarative format without code, the framework runtime components 130A-D may be executable on a wide variety of host computing devices, even including many of those with limited processing and/or memory capacity. In one specific example, the platform-independent commands 150 may be expressed using a language-independent data format, such as JavaScript Object Notation (JSON). Some specific example formats and properties of the platform-independent commands 150 are described in detail below. In the example of FIG. 1, each framework runtime component 130A-D ingests the platform-independent commands 150 and uses them to generate a respective set of rendering instructions 135A-D. The rendering instructions 135A-D are instructions for generating, modifying, updating and interacting with user interfaces on a respective computing platform 140A-D. The rendering instructions 135A-D may be platform-specific, such that they are wholly or partially different from one another across different platforms. In some examples, the rendering instructions 135A-D may employ native user interface toolkits of a respective target platform and/or cross-platform widget libraries for rendering of the virtual surface and its contents.

Figure 2:
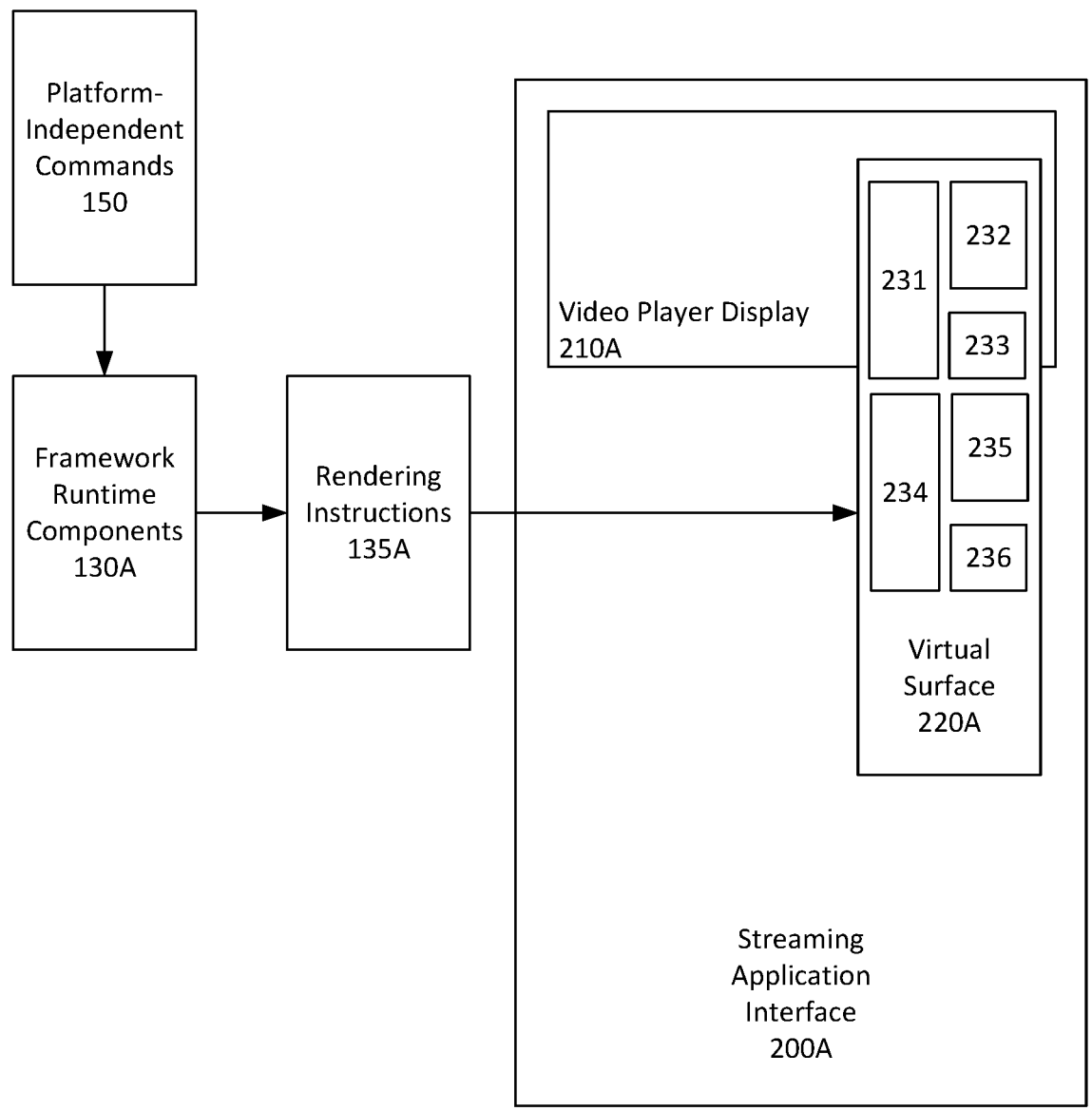
FIG. 2 is diagram illustrating a first example abstract surface that may be used in accordance with the present disclosure.
Figure 3:
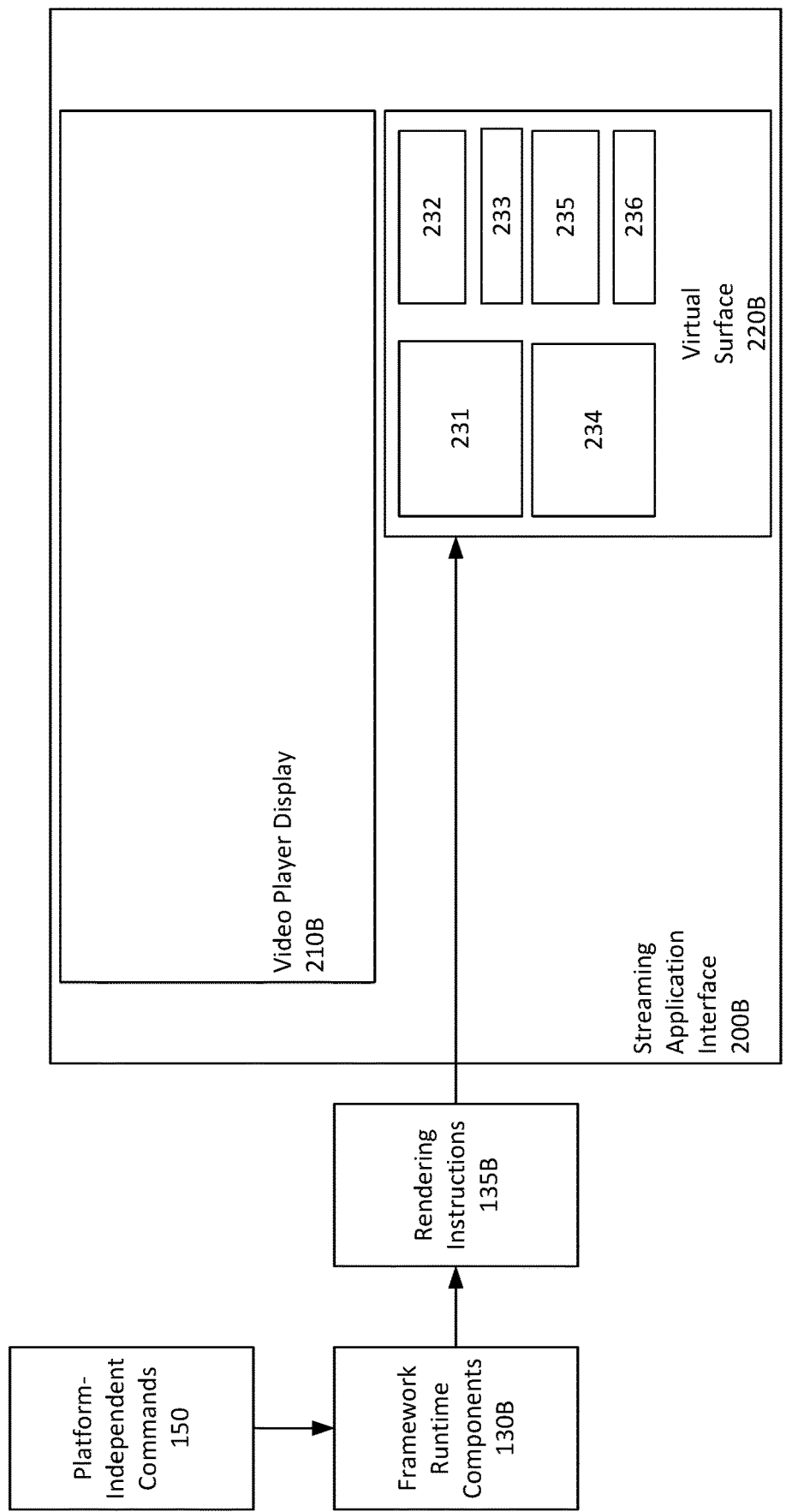
FIG. 3 is a diagram illustrating a second example abstract surface that may be used in accordance with the present disclosure.
Figure 4:
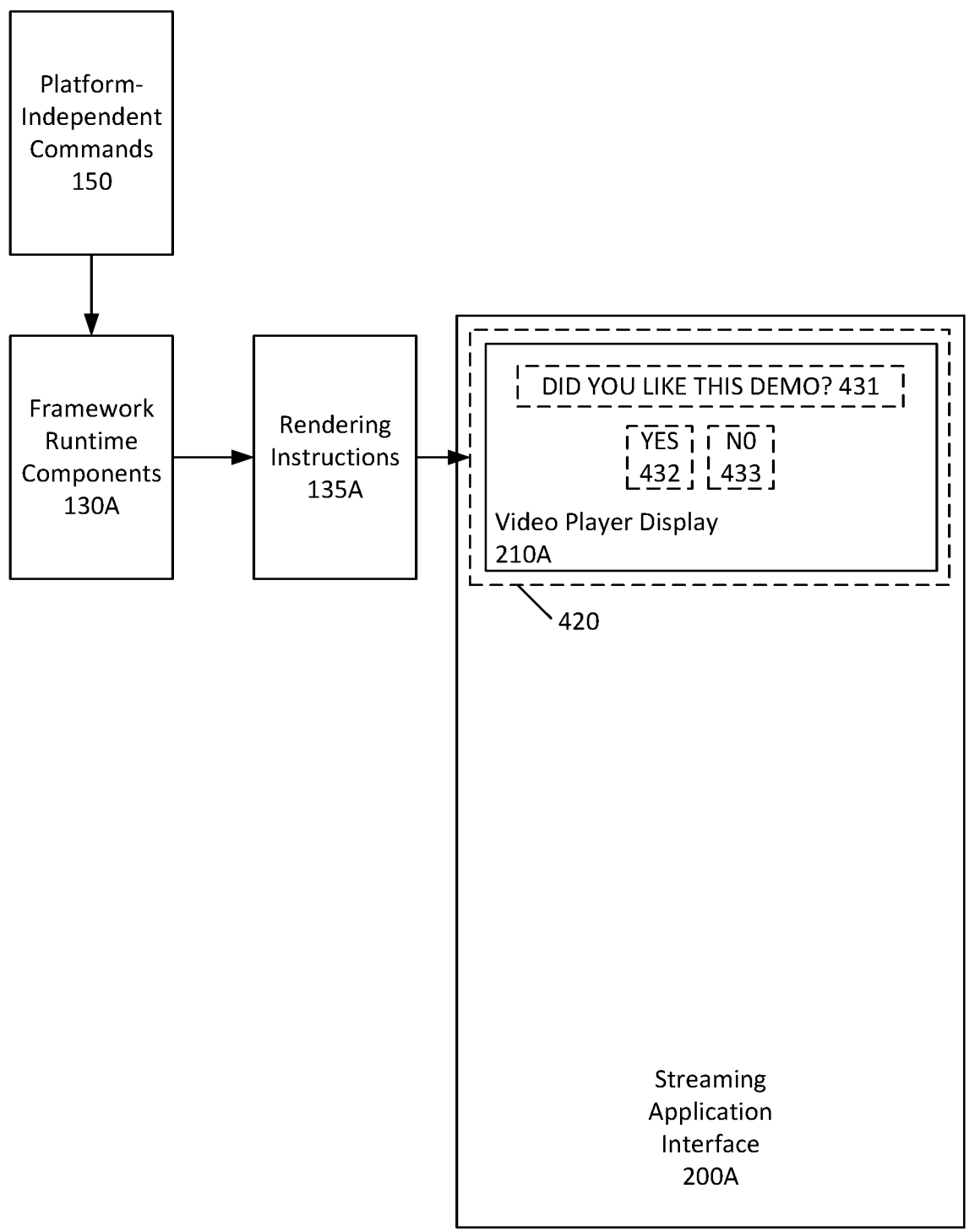
FIG. 4 is a diagram illustrating a third example abstract surface that may be used in accordance with the present disclosure.

In some examples, the platform-independent commands 150 may create user interfaces by defining virtual surfaces for display within the video streaming applications 120A-D. As used herein, the term virtual surface (also referred to herein as an abstract surface) is a user interface that is capable of being displayed (potentially with different size, shape, position, and/or other characteristics) in a plurality of computing platforms. The virtual surfaces are screen areas within which the video streaming applications 120A-D delegate rendering to the framework runtime components 130A-D. In some examples, the platform-independent commands 150 may give each virtual surface a unique name and may include identifications of one or more display items, such as widgets (e.g., text, images, video, graphics, animations, input controls, etc.), to include in the virtual surface and one or more properties (e.g., size, position, color, visibility, etc.) of each of the one or more display items. Referring now to FIGS. 2-4, some example virtual surfaces will now be described in detail. In particular, as shown in FIG. 2, platform-independent commands 150 may be ingested by framework runtime components 130A and used to generate rendering instructions 135A for rending a virtual surface 220A for display in streaming application interface 200A of video streaming application 120A. In this example, streaming application interface 200A includes a video player display 210A that displays the video content streamed from the video streaming service 110, and the virtual surface 220A is a rectangular interface that partially overlays video player display 210A. Specifically, the upper portion of virtual of the virtual surface 220A overlays the video player display 210A, while the lower portion of the virtual surface 220A overlays other screen area below the video player display 210A. In the example of FIG. 2, the virtual surface 220A includes a number of display items 231-236 (e.g., widgets), such as text, images, video, graphics, animations, input controls, etc. In one specific example, display items 231 and 234 could be images of different products, while display items 232 and 235 could include text that describes those products, and display items 233 and 236 could be customer ratings (e.g., star ratings) for the products. In another example, display items 231-236 could include different contents, such as text of a poll question and checkboxes corresponding to various different poll answers or other types of input.

It is noted that different computing platforms may manage the virtual surfaces using best practices and user paradigms of their target devices. This means that, although the commands for creating a virtual surface may be the same across different platforms, the size, shape, positioning and other properties of the resulting rendered virtual surfaces may differ across different platforms. In particular, it is noted that the example virtual surface 220A shown in FIG. 2 corresponds to video streaming application 120A of computing platform 140A. By contrast, other virtual surfaces that are generated on other computing platforms may differ from virtual surface 220A, even if those virtual surfaces are generated from the same virtual surface definition within the platform-independent commands 150. For example, referring now to FIG. 3, another virtual surface 220B is shown within another streaming application interface 200B of another video streaming application 120B of another computing platform 140B. Virtual surface 220B may be created using rendering instructions 135B generated by framework runtime components 130B based on platform-independent commands 150. In this example, although virtual surface 220A of FIG. 2 and virtual surface 220B of FIG. B are created using the same platform-independent commands 150, the size, shape and position of the virtual surfaces 220A and 220B differ due to their different respective computing platforms 140A and 140B. Specifically, as shown in FIG. 3, instead of a rectangular virtual surface 220A that partially overlays the video player display 210A (as in FIG. 2), virtual surface 220B is a square virtual surface that is positioned entirely underneath the video player display 210B.

In addition to the size, shape and position, other aspects of a virtual surface may also differ between computing platforms. For example, in some cases, a user may control showing and hiding of the virtual surfaces 220A and 220B in computing platforms 140A and 140B using a dedicated controller button. By contrast, in a different computing (e.g., computing platform 140C), showing and hiding of the virtual surface could be controlled using an icon displayed within the virtual surface. As another example, in another different computing (e.g., computing platform 140D), the showing and hiding of the virtual surface could be performed using an icon in landscape mode, while the virtual surface could be displayed permanently while in portrait mode. In some examples, the shape, size and positioning of the virtual surfaces may be inconsequential to the framework and may be fully managed by the host streaming application/computing platform.

Another example of a virtual surface that may be rendered to include additional content is shown in FIG. 4. As shown in FIG. 4, a virtual surface 420 may be rendered that overlays the screen area of the video player display 210. In the example of FIG. 4, the virtual surface 420 includes display items 431, 432 and 433. In particular, display item 431 is a poll questions that asks whether the viewer liked a demo. Display items 432 and 433 include the text "YES" and "NO" in order to allow the user to vote on the poll question. In some examples, virtual surface 420 may be transparent (with the exception of the text within display items 431, 432 and 433), thereby allowing the virtual surface to be rendered while only partially obstructing small portions of the underlying video content. In the example of FIG. 4, virtual surface 420 is rendered in streaming application interface 200A of video streaming application 120A for computing platform 140A. It is noted, however, that, similar to the virtual surfaces 220A and 220B of FIGS. 2 and 3, virtual surface 420 of FIG. 4 may also have characteristics that vary across different computing platforms. It is noted that any number of virtual surfaces may be simultaneously rendered within the streaming application interface at any given time.

Thus, as described above, virtual surfaces may be registered and defined using platform-independent commands 150. One example format for registering a new virtual surface (also referred to herein as an abstract surface) is shown below:
    registerAbstractSurface(abstractSurface, name)
The type of the abstract surface may vary per platform matching the implementation of the framework runtime in each platform. Platform-independent commands 150 may also be used to define a virtual surface, such as by using the example format below:
    "type": ,
    <metadata>
    "content": [ ]

In the above format, "type" may be required to match a previously registered abstract surface. Metadata may be an arbitrary number of elements that can be queried by the host streaming application but that are not used by the framework runtime components. The "content" field may include the set of display items (e.g., widgets) to be instantiated in the abstract surface. The framework runtime components may reset the target abstract surface whenever they receive a new definition to guarantee a consistent state after processing the user interface definition. In some examples, the available set of display items/widgets may include items such as space (i.e., a widget with no content), text, image, button, toggle/checkbox, text field, star rating, and custom graphics. Platform-independent commands 150 may also be used to define a display item/widget, such as by using the example format below:
    <widget-name>:
        <attribute>: <value>,
        <attribute>: <value>
The set of available widget attributes, as well as default and required values, may be widget-dependent.

In some examples, all available display items/widgets may support one or more common properties, while individual display items/widgets may also support additional widget-specific properties. In some examples, the common properties supported by all widgets may include properties such as position, size, background color, visible, padding and identifier. The position property may have a relative X dimension value and a relative Y dimension value that are relative to the widget's parent interface. Some examples of relative positions are described in greater detail below. The size property may have a width value and a height value that indicate the widget's size. The background color property may include a value that indicates background color for a widget, such as a hexadecimal encoded red-green-blue (RGB) with optional alpha channel. The visible property may have a value that indicates widget visibility (e.g., shown or hidden). The padding property may have a value, such as four integers, that represent the padding, in points, to be added around a widget to the top, left, bottom and right. In some examples, a single integer can be provided which will apply to all dimensions. The identifier property may have a value that serves to uniquely identify a widget within a particular virtual surface.

As set forth above, one example widget is a space widget (i.e., a widget that includes no content), which can be used for spacing or to display a color through its "background-color" property. For example, a red rectangle can be constructed with the following definition:
    "space":
    "background-color": "FF0000",
    "size": "50×40"
Another example widget is a text widget, which may be used to display text. In some examples, in addition to the common properties described above, a text widget may include widget-specific properties, such as value (e.g., the string to display), multiline (e.g., an indication of whether the text should reflow to be truncated), lines (e.g., an indication of a number of lines for displaying text), color (e.g., an indication of text color), alignment (e.g., text alignment, such as right left, center or justified), font size, font family, text shadow color, text format (e.g., bold, italic, etc.), and others. Another example widget is an image widget, which may be used to display an image. In some examples, in addition to the common properties described above, an image widget may include widget-specific properties, such as an image uniform resource locator (URL), which includes a URL (or other location) from which to retrieve the image for display. Another example widget is a button widget, which may be used to capture user interaction. In some examples, in addition to the common properties described above, a button widget may include widget-specific properties, such as label (e.g., the string to display), style (e.g., an indication to display a round border around the button), lines (e.g., an indication of a number of lines for displaying text), color (e.g., an indication of text color), text alignment, and text format. Another example widget is a toggle widget, such as an on/off switch. In some examples, in addition to the common properties described above, a toggle widget may include widget-specific properties, such as state (e.g., an indication of whether the toggle is on or off). Another example widget is a checkbox widget. In some examples, in addition to the common properties described above, a checkbox widget may include widget-specific properties, such as state (e.g., an indication of whether the checkbox is checked). Another example widget is a text field widget, which may be used to capture text/information from the user. In some examples, in addition to the common properties described above, a text field widget may include widget-specific properties, such as text (e.g., the text input in the widget), and hint (e.g., the placeholder text to display when the text field is empty). Another example widget is a stars rating widget, which shows feedback in the format of stars. In some examples, in addition to the common properties described above, a stars rating widget may include widget-specific properties, such as value (e.g., the number of stars to display, such as in 0.5 increments), star fill color, and star border color. Another example widget is a custom graphics widget. In some examples, in addition to the common properties described above, a custom graphics widget may include widget-specific properties, such as a value property, which may allow the custom graphics to be defined, for example using a format such as scalable vector graphics (SVG).

In some examples, the framework described herein may allow user interfaces to be created by using and combining containers. In some cases, vertical containers and horizontal containers may be employed, both of which may align widgets in a single column or row, respectively. In some examples, the platform-independent commands 150 may specify values for various container properties, such as alignment (e.g., right, top, center, fill, left, bottom), spacing, guides (e.g. relative size of each widget, for example in percentages of the container), background color, stretch (e.g., the direction in which to extend the container, for example left or right), and content (e.g., the widgets to be managed by the container). In some examples, using the fill alignment may stretch the container in its respective direction (e.g., across an entire column of a vertical container or across an entire row of a horizontal container). Also, in some examples, using the stretch property may cause the container to be extended over the other axis. For example, use of a vertical stretch property in a horizontal container may cause extension over a vertical axis, while use of a horizontal stretch property in a vertical container may cause extension over a horizontal axis. Additionally, in some examples, adding multiple widgets to a container may stack them in the container's natural order (e.g., over a column for vertical containers or over a row for horizontal containers, in accordance with the specified alignment). Moreover, stretching a container with multiple widgets may cause all widgets in the container to be extended in the manner described above for the stretch property. The guides property may be used when multiple widgets are present in a container with fill alignment. The guides may define the proportion of each widget in the container. In some examples, the values for the guides property may include an array of integers representing a respective percentage for each widget, with all values adding up to one hundred percent. In some cases, the last value in the array may be optional and may be calculated. For example, specifying a guides property using the notation "guides": ["30", "70"] may cause a first widget to occupy 30 percent of a row or column and a second widget to occupy the remaining 70 percent of a row or column.

Figure 5:
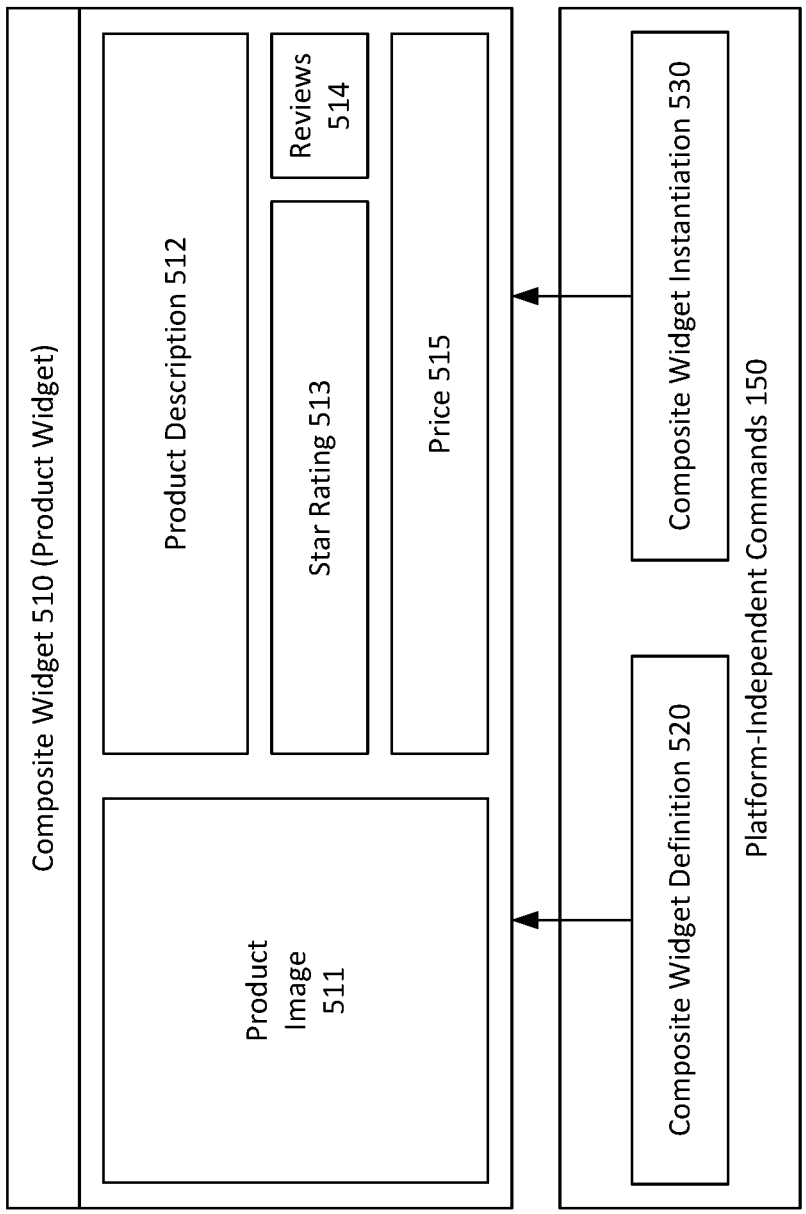
FIG. 5 is a diagram illustrating an example composite widget that may be used in accordance with the present disclosure.

In some examples, when the same combination of widgets is used repeatedly, the combination of these widgets may be defined in the platform-independent commands 150 using a composite widget. Use of the composite widget may improve efficiency and reduce complexity, such as by removing the need to re-define the combination of widgets each time that they are re-used. Separating data from layout allows the video streaming applications to produce these composite widgets much more efficiently, especially if the definition is being generated remotely. An example of a composite widget 510 is shown in FIG. 5. As shown, composite widget 510 is for display of a product. The composite widget 510 includes a product image sub-widget 511, a product description sub-widget 512, a star rating sub-widget 513, a review sub-widget 514 (e.g., indicating a quantity of available reviews), and a price sub-widget 515.

In some examples, the composite widget 510 may be re-used for each different product that is shown in a user interface. In the example of FIG. 5, the composite widget 510 may be created using a composite widget definition 520 and a composite widget instantiation 530. An example of a composite widget instantiation 530 is shown in FIG. 6. As shown, composite widget instantiation 530 is for a product with the identifier "Coffee 30." The composite widget instantiation 530 indicates a URL from which to obtain the product image sub-widget 511. The composite widget instantiation 530 also indicates that product description sub-widget 512 will state that the product is a thirty-ounce premium roast ground coffee. Additionally, the composite widget instantiation 530 indicates that the star rating sub-widget 513 will include 4.5 stars. Furthermore, the composite widget instantiation 530 indicates that the reviews sub-widget 514 will show 96 reviews. Finally, the composite widget instantiation 530 indicates that the price sub-widget 515 will show a price of $8.94. As should be appreciated, different values may be entered into the composite widget instantiation 530 for each different product. In some examples, the user-defined properties of the product widget may be specified in a flat namespace (i.e., a namespace without hierarchical structure), such as shown in composite widget instantiation 530, and they may not follow the hierarchical structure of the widgets that are included in the composite widget. This may allow the user-defined properties to be easily located, set, modified and retrieved, such as by not forcing the user to navigate a complex hierarchical structure.

In some examples, a command to define a composite widget 510 may have the following example format:
 "type": "widget",
 "surfaces": ,
 "name": <custom widget name>,
 "content": [ ]
A widget definition may be tied to a virtual surface. Widget names may be required to be unique for a definition on each virtual surface. Each configurable property for the composite widget may be required to be exported in the composite widget definition. Referring now to FIGS. 7A-B, an example of a composite widget definition 520 is shown for the product widget. In particular, part one of the composite widget definition 520 is shown in FIG. 7A, while part two (i.e., a continuation of part one) is shown in FIG. 7B. As shown in FIGS. 7A-B, the composite widget definition 520 lays out the contents of the composite widget 510, including the product image sub-widget 511, the product description sub-widget 512, the star rating sub-widget 513, the review sub-widget 514 (e.g., indicating a quantity of available reviews), and the price sub-widget 515. Specifically, the product image sub-widget 511 employs a respective image widget, the product description sub-widget 512 employs a respective text widget, the star rating sub-widget 513 employs a respective star rating widget, the review sub-widget 514 employs a respective text widget, and the price sub-widget 515 employs a respective text widget. As also shown in FIGS. 7A-B, the composite widget definition 520 employs a number of horizontal and vertical containers to organize the layout of the sub-widgets 511-515, such as by using the alignment, guides, and other container properties described in detail above.

In some examples, a user interface on a virtual surface may be dynamically changed, such as by issuing exec commands, for example using the format shown below:
"type": "exec",
: [
subcommand
]

The available subcommands may include, for example, delete, set, clear, add, and run. The delete subcommand (del) may be used to delete widgets from a virtual surface, for example using the following format: "del": <widget-name>| [<widget-name>, <widget-name>, . . . ]. The set subcommand may be used to change a widget's property, for example using the format shown below:
"set": {
<widget-name>: {
<property>: <new-value>
}

The clear subcommand may be used to remove all widgets from a container, for example using the format shown below:
"clear": <container-name>

The add subcommand may be used to insert new widgets into a container, for example using the format shown below:
"add": [
{
"target": <container-name>|"#surface",
"widgets": [
<widget>
]
}
]

The run subcommand may be used to trigger an animation optionally running a set of commands after the animation is done. When provided, a debug argument may cause the path of the animation to be displayed on the screen while the animation is running. A target property defines a view which will serve as a container for the animation. If a target property is not provided, the animation may run in the entire container. A delay property may be used to delay animations, such as to give the impression that different paths are being taken by different images being animated. Below is an example format for the run subcommand:
"run":
"widget": <widget-name>,
"anim": <animation-name>,
"delay": <seconds>,
"debug": "true",
"target": <widget-name>,
"done": [
exec commands
]
}

In some examples, the framework described herein may provide a library of animations that can be triggered via a command, such as an exec command. For example, the library may include built-in animations, such as a reveal/hide animation (e.g., sets either width or height to zero and back to an original value), a 180 degree toggle animation (e.g., rotates a widget 180 degrees), and a toggle visibility animation (e.g., show/hide a widget using a default platform animation). New animations can be defined with an anim exec subcommand. User-defined animations may specify paths that a widget will traverse within a specified time period, such as at constant and/or varying speeds. An example format for defining an animation is shown below:
"anim": [
{
"id": <animation-name>,
"duration": <time-in-seconds-float>,
"path": [
<subpath>
]
}
]

The subpath field shown in the above format may begin with a start element followed by any number of connected subpaths. Subpaths may be defined with commands such as start, line, bezier, and repeat. The start command may indicate a coordinate of the beginning of the animation. The line command may indicate a straight path from the end of the last subpath to a provided point. The bezier command may indicate either a cubic or quadratic curve. Two control points may be used for a cubic curve, and one control point may be used for a quadratic curve. The bezier command may take the following format: {"bezier": "XxY", "control1": "XxY", "control2": "XxY"}.

The repeat command may define a subpath to be traced multiple times. An example format for the repeat command is shown below:
"repeat": {
"times": <repetitions>,
"path": [<subpath>]
}

Figure 8:
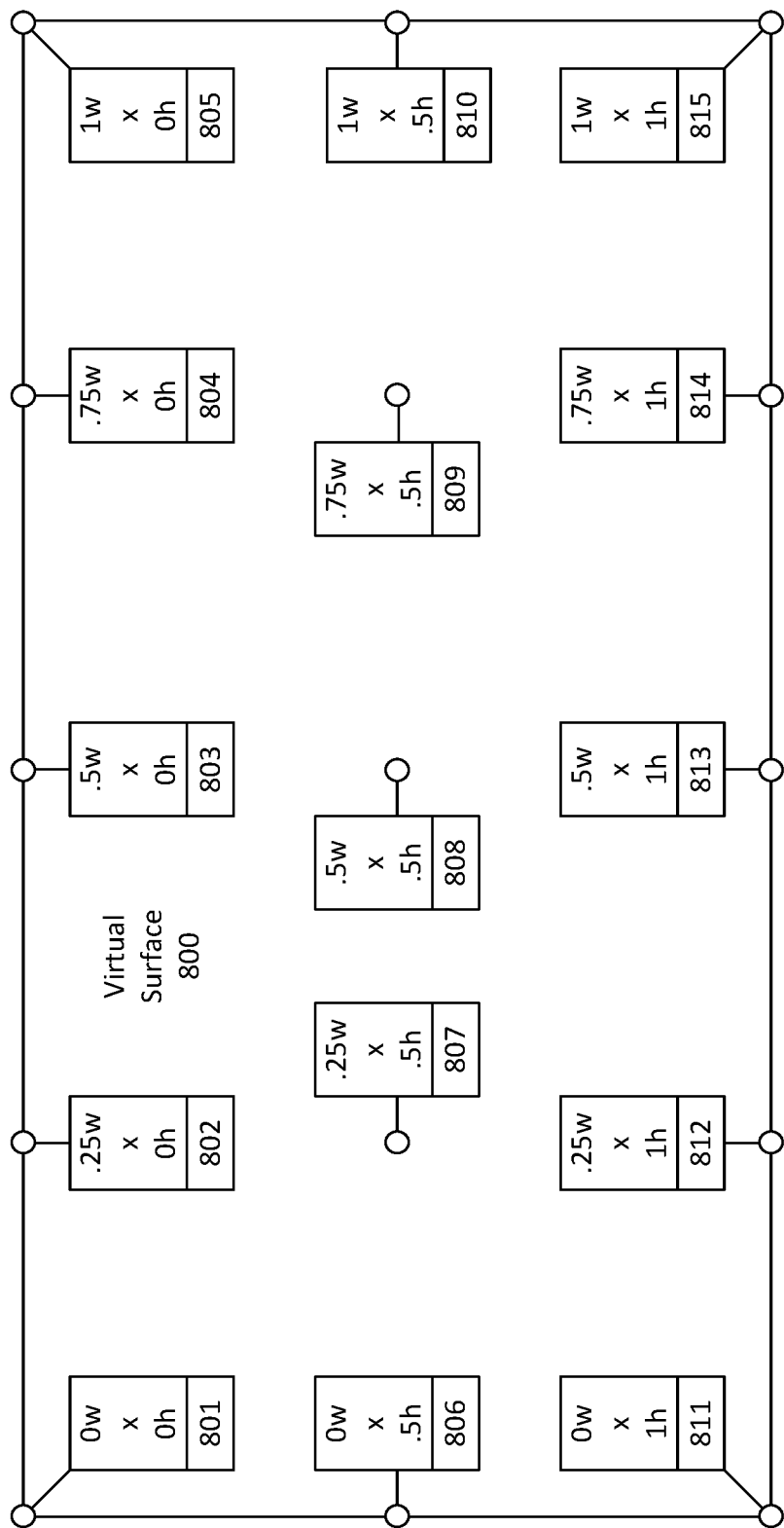
FIG. 8 is diagram illustrating example relative positions that may be used in accordance with the present disclosure.

In some examples, coordinates may be expressed relative to a virtual surface or parent widget, for example to allow the entire path to dynamically adapt to changes in the video streaming application state, such as the orientation on a mobile application. The variables w (width) and h (height) are available and may be used to construct expressions whenever a coordinate is required. For example, to start a path from the center of the screen, the following notation may be used: {"start": "0.5*wx0.5*h"}. Referring now to FIG. 8, relative positions 801-815 are shown for various respective points within a virtual surface 800. For example, relative position 801 (0wx0h) is for the top left corner of the virtual surface 800, relative position 805 (1wx0h) is for the top right corner of the virtual surface 800, relative position 811 (0wx1h) is for the bottom left corner of the virtual surface 800, relative position 815 (1wx1h) is for the bottom right corner of the virtual surface 800, and relative position 808 (0.5wx0.5h) is for the center of the virtual surface 800.

Relative positions 801-805 are for respective points along the top of virtual surface 800 (at increments of 0.25 of the width of virtual surface 800), relative positions 806-810 are for respective points along the vertical center of virtual surface 800 (at increments of 0.25 of the width of virtual surface 800), and relative positions 811-815 are for respective points along the bottom of virtual surface 800 (at increments of 0.25 of the width of virtual surface 800).

Referring now to FIG. 9, an example animation command 900 is shown. This example animation command 900 animates a widget of type text (the word Wow!!!) from the left of the screen to the center, then bounces 9 times ending at the center of the screen. In some examples, the animation command 900 may be pushed from a remote server or other sender to a video streaming application to cause the animation to be performed. The animation command 900 includes anim, add and run sections for performing operations such as described above. The animation command 900 employs the add section to insert a widget onto a screen. The add section may not be needed when animating a widget that is already on the screen. Similarly, the anim block could be defined once when the application starts and reused many times. The anim block defines the duration and the path of the animation. The coordinates are functions where w and h are the width and height respectively of the container the animation is running on. The coordinate 0×0 is the top left corner of the container. Therefore, a starting point of "0×0.5*h" refers to the left edge of the screen at the vertical center. The second point of the animation is "0.5*w×0.5*h" which means the center of the screen. For example, referring now to FIG. 10, the start of the animation defined by animation command 900 is shown, with the text of the animation (the word Wow!!!) starting from the left edge of the vertical center, as shown by relative position 806 (0w×0.5h). The word Wow!!! will move from the relative position 806 towards relative position 808 (0.5w×0.5h) at the center of the screen. Referring back to FIG. 9, the "repeat" field of animation command 900 causes the animation to bounce between relative position 806 and 808. It is noted that, simply be changing the "start" field of animation command 900, the animation may be modified to initiate from a different location. For example, changing the "start" field to {"start": "w×0.5*h" } may cause the animation to start at the right edge of the screen at the vertical center. For example, referring now to FIG. 11, the text of the modified animation (the word Wow!!!) now starts from the right edge of the vertical center, as shown by relative position 810 (1w×0.5h). The word Wow!!! will move from the relative position 810 towards relative position 808 (0.5w×0.5h) at the center of the screen.

Figure 12:
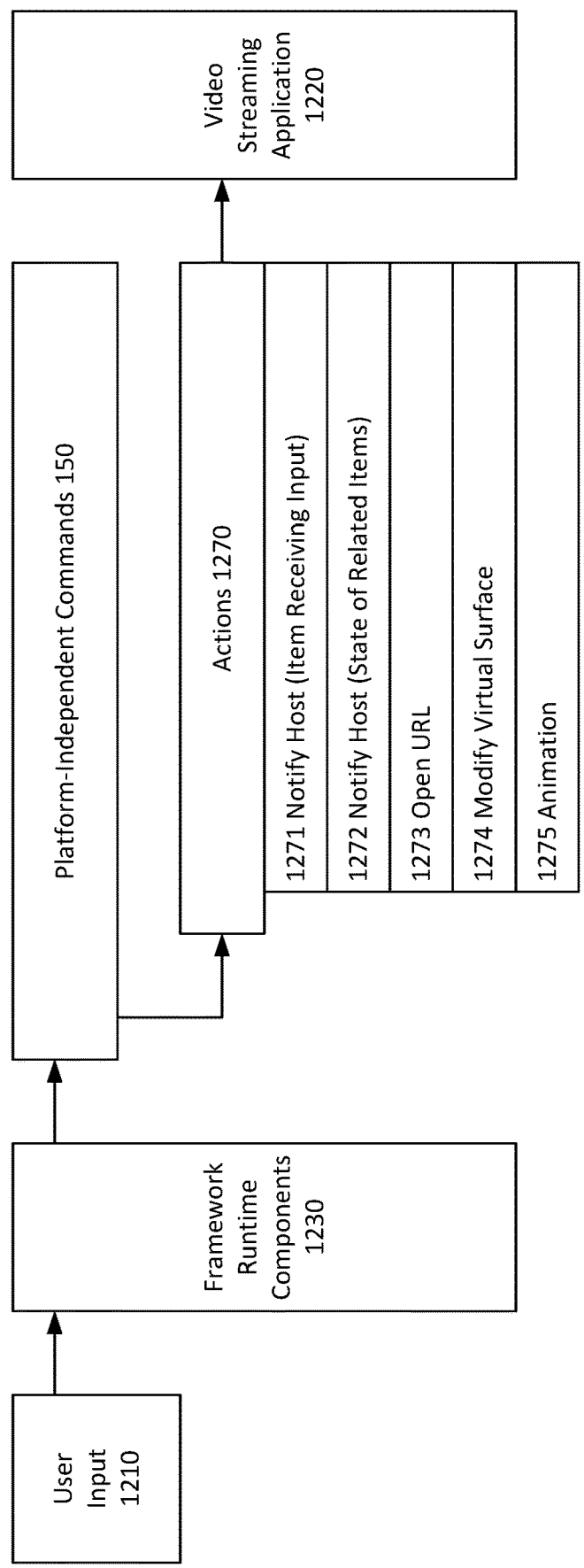
FIG. 12 is a diagram illustrating an example actions in response to user input that may be used in accordance with the present disclosure.

In some examples, widgets may support an action property that allows various specified actions to be performed in response to user input. Referring now to FIG. 12, some example actions 1270 that may be performed in response to user input 1210 will now be described in detail. As shown, a user input 1210 may be performed upon a widget and detected by framework runtime components 1230. Some examples of user input 1210 may include entry of text in a text input field, selection of a button, checkbox or toggle, and the like, such as to place a wager, vote in a poll, or otherwise input information into a user interface. As shown in FIG. 12, platform-independent commands 150 may indicate various actions 1270 to be performed in response to the user input 1210, such as by specifying those actions 1270 through a widget's action property as described above. In the example of FIG. 12, the actions 1270 may include example actions 1271-1275. Specifically, action 1271 is for notifying the host video streaming application 1220 of the widget that receives the user input. Any global state previously set may be automatically included in this notification. For example, if action 1271 has been assigned to a vote button widget, then action 1271 may cause the video streaming application 1220 to be notified when the user selects the vote button to vote in a poll. The short form of the action 1271 can be added to a widget in this format:

"action": "notifyHost"

Action 1272 is for notifying the host video streaming application 1220 of the state of other widgets when the user input 1210 is received. In order to specify the action 1272, widget identifiers for the other widgets may be provided in an optional array to this element. For example, when the vote button widget is selected, the command below may cause the state of three other widgets (checkbox001, text001, and text 002) to be provided to the video streaming application 1220:

"action": [
  {"notifyHost":["checkbox01", "text01", "text02"]}
]

For example, checkbox 001 may be checkbox to vote YES or NO on a poll question, while text001 and text002 may be text widgets that include the text of the poll question. Thus, in the above example, by providing the state of these other related widgets to the video streaming application 1220, the video streaming application may be notified of the text of the poll question and the contents of the user's vote (e.g., YES or NO).

Action 1273 is for opening a URL in response user input to a widget, for example using a platform's preferred mechanism. If the platform is not capable of opening URL's, this action may be silently ignored. Action 1274 is for modifying a virtual surface in response to user input to a widget, such as by using the delete, set, clear, add, and run subcommands described above. As described above, the delete subcommand (del) may be used to delete widgets from a virtual surface. The set subcommand may be used to change a widget's property. The clear subcommand may be used to remove all widgets from a container. The add subcommand may be used to insert new widgets into a container. An exec block may be provided allowing for modifications to the abstract surface to happen in response to user input 1210. Action 1275 is for running an animation in response to user input to a widget, such as using the animation techniques described in detail above. In some examples, a combination of all actions 1270 can be registered in a single action block.

The framework runtime may manage two categories of state: context and rendering. An example command to alter state is shown below:

"type": "state",
"context": <JSON>,
<key>: <boolean>

When present, context may be included in notifyHost callback messages. The framework may not process this value otherwise. Other values may be used to conditionally include elements when parsing a user interface definition or adding new widgets to a virtual surface. In some examples, a # if property may instruct the runtime to look up a key in the global state and only instantiate a widget if the value is present and set to true. This property may, for example, allow the framework to conditionally display logos based on specified states. As a specific example, this property may be used to display a widget including a logo indicating a certain membership level or status when it is determined that the interface is being displayed to a user that has acquired that membership level or status.

Figure 13:
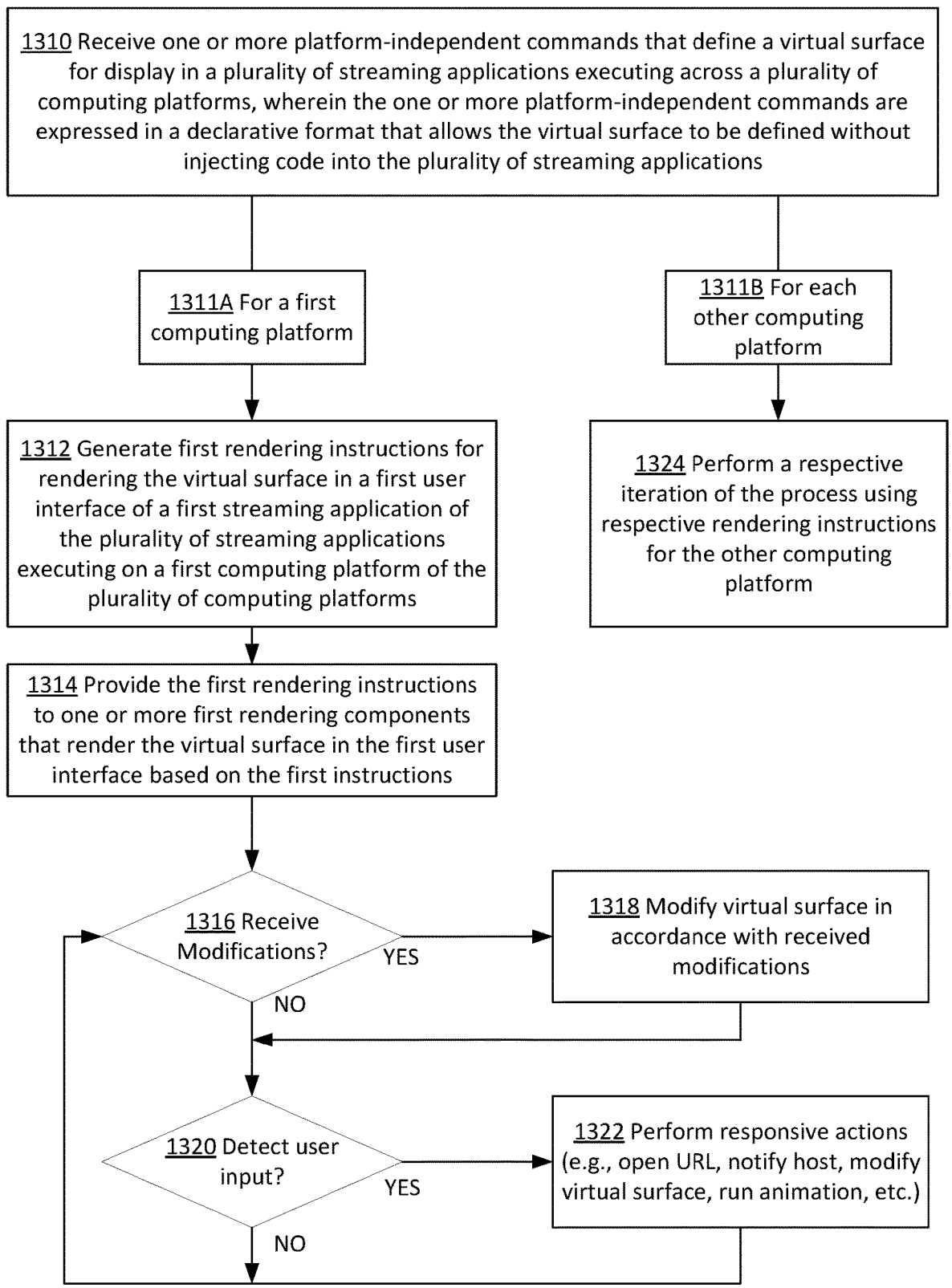
FIG. 13 is a flowchart illustrating an example process for providing a virtual surface that may be used in accordance with the present disclosure.

FIG. 13 is a flowchart illustrating an example process for providing a virtual surface that may be used in accordance with the present disclosure. In some examples, operations 1310-1322 may be performed by a first framework runtime component of a first computing platform, while operations 1310 and 1324 may be performed by other framework runtime components of other computing platforms. The process of FIG. 13 is initiated at operation 1310, at which one or more platform-independent commands are received that define a virtual surface (also referred to herein as an abstract surface) for display in a plurality of streaming applications executing across a plurality of computing platforms. The one or more commands are expressed in a declarative format that allows the virtual surface to be defined without injecting code into the plurality of streaming applications. As described above, the platform independent commands may be received by a plurality of framework runtime components whose execution is hosted by a plurality of video streaming applications executing across a plurality of computing platforms. In some examples, the one or more commands may include identifications of one or more display items (e.g., widgets) included in the virtual surface and one or more properties of each of the one or more display items. Additionally, in some examples, the one or more commands may include an indication of an action to perform in response to user input to a display item in the virtual surface, such as issuing a notification of the user input to a streaming application, providing an indication of a state of one or more other display items when the user input is received, modifying the virtual surface, running an animation, and the like. The one or more commands may include instructions to conditionally display a display item in the virtual surface based on a specified state. The one or more commands may also include instructions to render a composite display item, such as composite widget 510 of FIG. 5, that is a composite of a plurality of display items whose values are specified in a flat namespace without hierarchical structure, such as composite widget instantiation 530 of FIG. 6.

As described in detail above, upon receipt of the platform-independent commands, different framework runtime components on different respective computing platforms may use the platform-independent commands to generate respective rendering instructions for rendering the virtual surface on their respective computing platforms. In particular, as shown in FIG. 13, branch 1311A is performed for a first computing platform. Specifically, at operation 1312, first rendering instructions are generated for rendering the virtual surface in a first user interface of a first streaming application of the plurality of streaming applications executing on a first computing platform of the plurality of computing platforms. The first rendering instructions are generated based on the one or more platform-independent commands. The first rendering instructions may be platform-specific, such that they are wholly or partially different from other rendering instructions for other computing platforms. In some examples, the first rendering instructions may employ native user interface toolkits of a respective target platform and/or cross-platform widget libraries for rendering of the virtual surface and its contents. Specifically, the first rendering instructions may include instructions to render the widgets and/or toolkit elements in accordance with values of the properties that are specified in the platform-independent commands, such as those described in detail above and not repeated here. The size, shape, position and other features of the virtual surface (e.g., whether the virtual surface is permanently displayed or displayed based on screen orientation, tools for showing and hiding the virtual surface, etc.) may vary between computing platforms. At operation 1314, the first rendering instructions are provided to one or more first rendering components that render the virtual surface in the first user interface based on the first rendering instructions. For example, the first rendering instructions may be provided to one or more user interface toolkits that are native to the first computing platform, such as for rendering interface elements that are native to the first computing platform. Additionally, the first rendering instructions may be provided to one or more cross-platform widget libraries. These and other components may then render the virtual surface and its contents in the first user interface based on the first rendering instructions.

At operation 1316, it is determined whether any modifications to the virtual surface are received. For example, as described in detail above, a user interface on a virtual surface may be dynamically changed, such as by issuing exec commands. The modifications may be achieved using the delete, set, clear, add, and run subcommands described above. As described above, the delete subcommand (del) may be used to delete widgets from a virtual surface. The set subcommand may be used to change a widget's property. The clear subcommand may be used to remove all widgets from a container. The add subcommand may be used to insert new widgets into a container. If modifications are received, then, at operation 1318, the virtual surface is modified in accordance with the received modifications.

At operation 1320, it is determined whether user input is detected to a display item in the virtual surface. For example, as described above, an action property may be defined for a display item/widget in the platform-independent commands that causes the framework runtime components to perform one or more actions when user input to the display item/widget is detected. If user input is detected, then, at operation 1322, one or more responsive actions may be performed. As described above, the responsive actions may include, for example, opening a URL, notifying the host streaming application that the user input was received for the widget and optionally providing an indication of states of other related widgets, modifying the virtual surface (e.g., including any of the modifications described above for operations 1316-1318), and running an animation. As shown, the process may continually cycle through operations 1316-1322, such as to receive and respond to modifications and/or user input at any given time.

As also shown in FIG. 13, branch 1311B is performed for each other computing platform to which the same video content is streamed. Specifically, at operation 1324, a respective iteration of the process (e.g., similar to operations 1312-1322) is performed using respective rendering instructions for the other computing platform. For example, in some cases, second instructions may be generated for rendering the virtual surface in a second user interface of a second streaming application of the plurality of streaming applications executing on a second computing platform of the plurality of computing platforms. The second instructions may be generated based on the platform-independent commands. The second instructions may be provided to one or more second rendering components that render the virtual surface in the second user interface based on the second instructions. As described above, in some examples, a size, shape, and/or position of the virtual surface may differ between the first user interface of the first computing platform and the second user interface of the second computing platform, for example such as the shape, size and position of virtual surface 220A of FIG. 2 and virtual surface 220B of FIG. 3 differ from another.

FIG. 14 is a flowchart illustrating an example process for rendering a display item using relative positioning that may be used in accordance with the present disclosure. The process of FIG. 14 is initiated at operation 1410, at which one or more commands (e.g., platform-independent commands 150 of FIG. 1) are received indicating a first position within a virtual surface for display of a display item (e.g. a widget), such as an image, text, button, checkbox, text input field, and the like. The one or more commands may be associated with a virtual surface that is displayed in a streaming application. The first position is expressed based at least in part on a first relative amount of a first positional attribute that is relative to a first total amount of the first positional attribute for the virtual surface in its entirety. As described above, in some examples, the first positional attribute may be width (X dimension), and the first relative amount may be a relative width that is relative to a total width of the virtual surface in its entirety. Also, in some examples, the first positional attribute may be height (Y dimension), and the first relative amount may be a relative height that is relative to a total height of the virtual surface in its entirety.

In addition to the first positional attribute, first position may be expressed optionally further based in part on one or more other relative amounts of one or more other positional attributes. For example, the first position may be further expressed based in part on a second relative amount of a second positional attribute that is relative to a second total amount of the second positional attribute for the virtual surface in its entirety. Thus, in some examples, the first and second positional attributes may include width and height. In one specific example, the first positional attribute is width and the first relative amount is a relative width that is relative to a total width of the virtual surface in its entirety, while the second positional attribute is height and the second relative amount is a relative height that is relative to a total height of the virtual surface in its entirety. Some examples of this is are shown in FIG. 8, in which a number of locations are expressed as relative positions 801-815, including relative widths (X dimension) and relative heights (Y dimension) for a virtual surface 800 in its entirety.

In some examples, the first relative amount may be expressed as a mathematical function with respect to the first total amount, such as a percentage, a ratio, or a fraction of the first total amount. As described above, the display item may be displayed as part of an animation. As also described above, the first position may a starting position of the animation or an ending position of the animation. The one or more commands may further indicate at least one of a duration, a repetition, or a delay associated with the animation.

At operation 1412, rendering instructions are generated for rendering the virtual surface including the display item in a user interface of the streaming application. The rendering instructions may be generated based on the one or more commands received at operation 1410. For example, as described in detail above, upon receipt of the platform-independent commands, different framework runtime components on different respective computing platforms may use the platform-independent commands to generate respective rendering instructions for rendering the virtual surface, including display items within the virtual surface, on their respective computing platforms. In some examples, the rendering instructions may employ native user interface toolkits of a respective target platform and/or cross-platform widget libraries for rendering of the virtual surface and its contents. Specifically, the first rendering instructions may include instructions to render the widgets and/or toolkit elements in accordance with values of properties that may be specified in the commands received at operation 1410, such as those described in detail above and not repeated here. The size, shape, position and other features of the virtual surface may vary between computing platforms.

Figure 10:
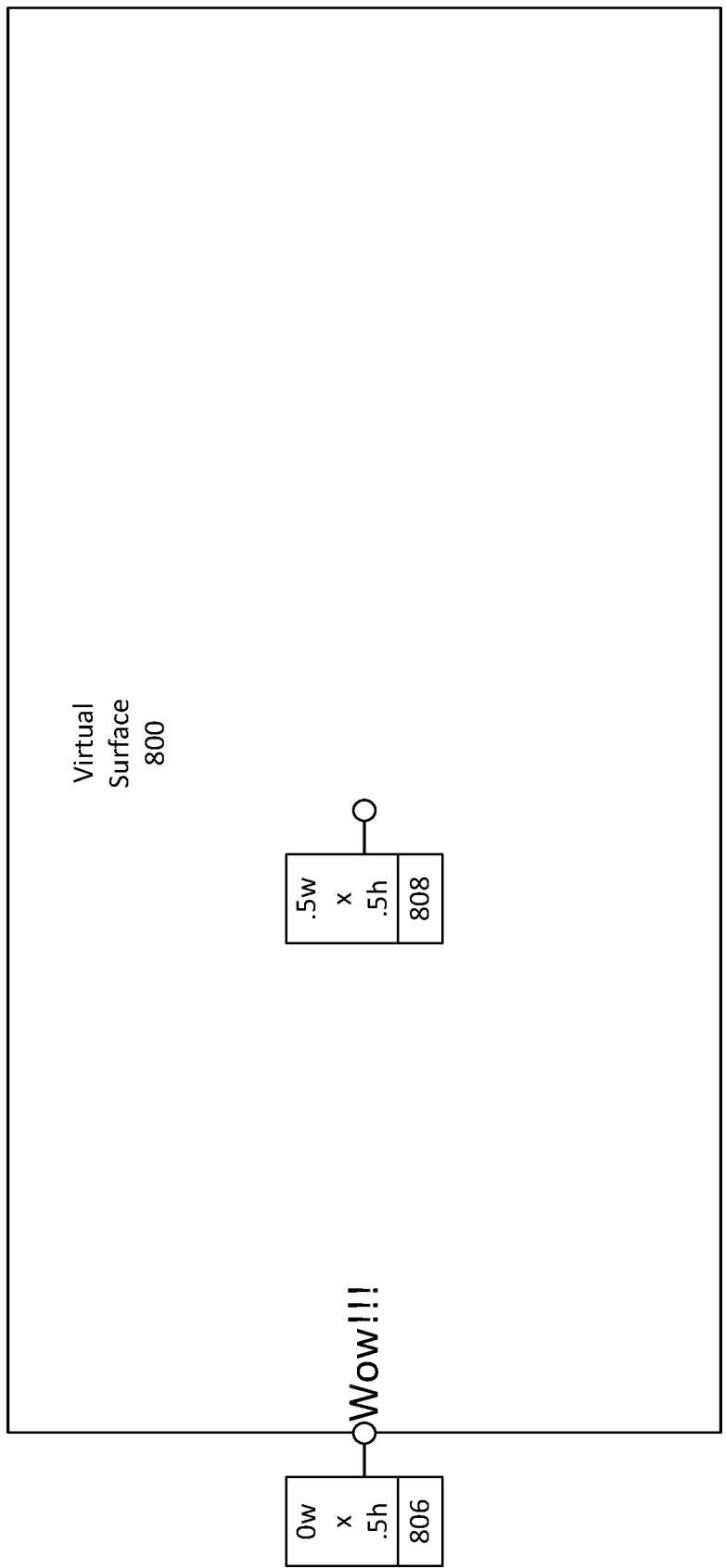
FIG. 10 is a diagram illustrating a first example animation that may be used in accordance with the present disclosure.
Figure 11:
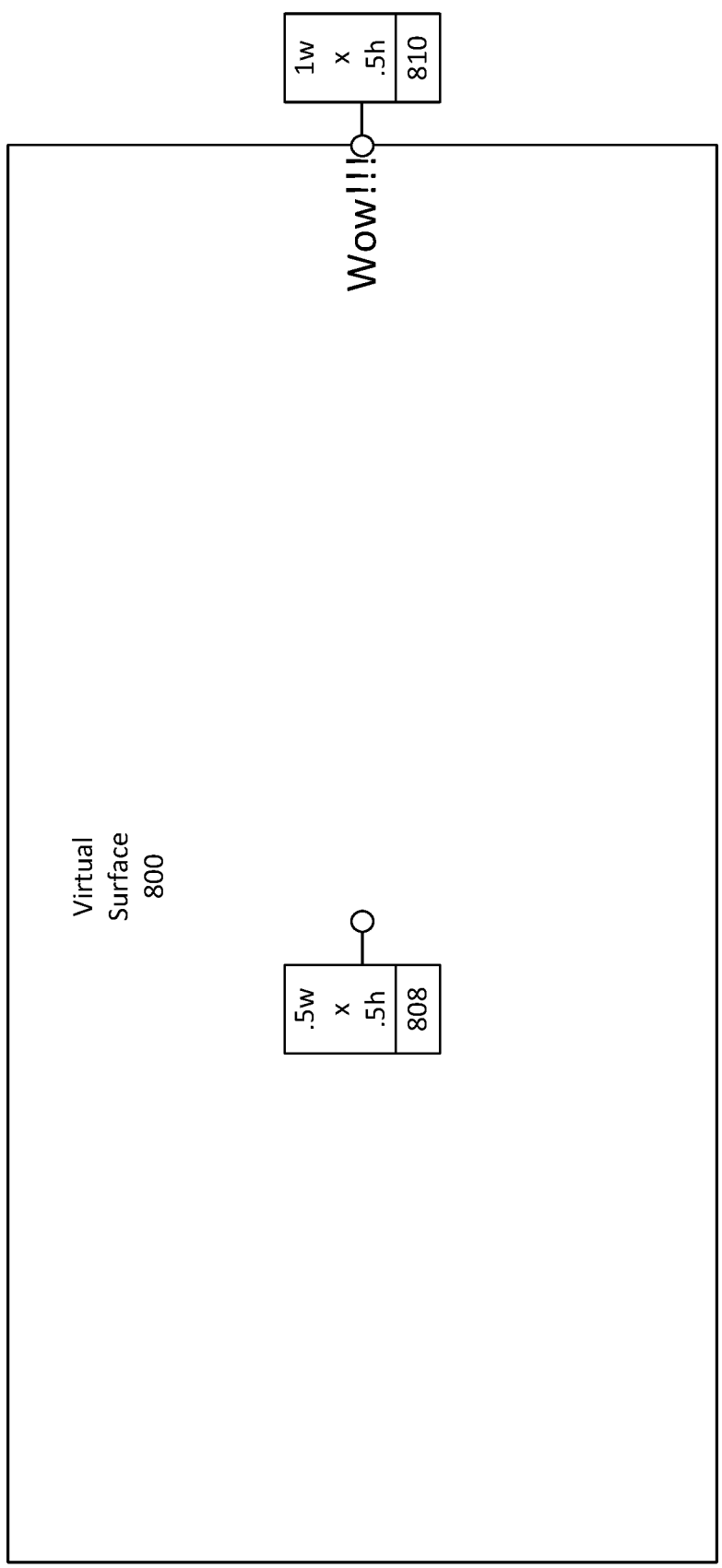
FIG. 11 is a diagram illustrating a second example animation that may be used in accordance with the present disclosure.

At operation 1414, the rendering instructions are provided to one or more rendering components that render the virtual surface including the display item in the user interface based on the rendering instructions. For example, the first rendering instructions may be provided to one or more user interface toolkits that are native to a host computing platform, such as for rendering interface elements that are native to the host computing platform. Additionally, the first rendering instructions may be provided to one or more cross-platform widget libraries. These and other components may then render the virtual surface and its contents in the user interface based on the rendering instructions The display item is displayed at the first position expressed based at least in part on the first relative amount. A specific example of this is shown in FIG. 9, in which an animation command 900 includes a relative "start" position of "0x0.5*h", which refers to the left edge of the virtual surface at the vertical center. As shown in FIG. 10, the animation (the word Wow!!!) is displayed starting from the left edge of the vertical center, as shown by relative position 806 (0w×0.5h).

In some examples, because the size, shape and other characteristics of a virtual surface may differ between different computing platforms (and/or between different screen orientations, such as platform and landscape, within the same computing platform), the actual resulting coordinates at which a widget is rendered may therefore differ between different computing platforms and/or screen orientations (even when being rendered based on the same relative positions). For example, in the scenario described above, an animation may have a relative start position of "0x0.5*h", which refers to the left edge of the virtual surface at the vertical center. Now suppose that the same virtual surface is rendered in a first computing platform with a height of ten coordinate points and is also rendered in a second computing platform with a height of twenty coordinate points. In this example, in the virtual surface for the first computing platform, the animation start point may be five coordinate points down from the top of the virtual surface (which is half of the height of ten coordinate points). By contrast, in the virtual surface for the second computing platform, the animation start point may be ten coordinate points down from the top of the virtual surface (which is half of the height of twenty coordinate points). In some examples, the respective framework runtime components may determine the actual resulting coordinate points at which a widget is rendered within their corresponding respective computing platforms. In particular, in some cases, the respective framework runtime components may determine the total measurements (e.g., total width, total height, etc.) for a particular virtual surface within their corresponding respective computing platforms, such as by requesting or otherwise obtaining the measurement information from toolkits, widget libraries, and/or other rendering components. The framework runtime components may then determine the actual resulting coordinate points for a widget based on the specified relative positions and the total measurements for the virtual surface. For example, in the scenario described above, the framework runtime components for the first computing platform may determine that the animation start point for the first computing platform is five coordinate points down from the top of the virtual surface (which is half of the height of ten coordinate points). Additionally, the framework runtime components for the second computing platform may determine that the animation start point for the second computing platform is ten coordinate points down from the top of the virtual surface (which is half of the height of twenty coordinate points). Upon making these determinations, the framework runtime components may instruct the toolkits and/or widget libraries to render the animations at the respective determined coordinate points for their respective computing platforms.

Moreover, in some examples, the framework runtime components may also monitor various control components for signals that cause a display to be reoriented, such as from portrait to landscape (or vice versa), as these re-orientations may cause the size, shape and other characteristics of the virtual surface to change. Upon determining an occurrence of such a reorientation, the framework runtime components may determine new total measurements for the reoriented virtual surface (e.g., new total width, new total height, etc.) and may accordingly recalculate new resulting widget positions based on the relative positions and the new total measurements. For example, if a display reorientation causes the height of a virtual surface to change from ten coordinate points to six coordinate points, then the framework runtime components may determine that a widget with a relative position of "0x0.5*h" should be moved from five coordinate points down from the top of the virtual surface (which is half of the previous height of ten coordinate points) to three coordinate points down from the top of the virtual surface (which is half of the new height of six coordinate points).

It is noted that, while many of the above examples in FIGS. 1-14 relate to the display of user interfaces within video streaming applications, the framework described herein is not necessarily limited to video streaming applications. Thus, in some examples, the framework described herein may be employed to generate user interfaces in any application that itself includes or provides a user interface.

Figure 15:
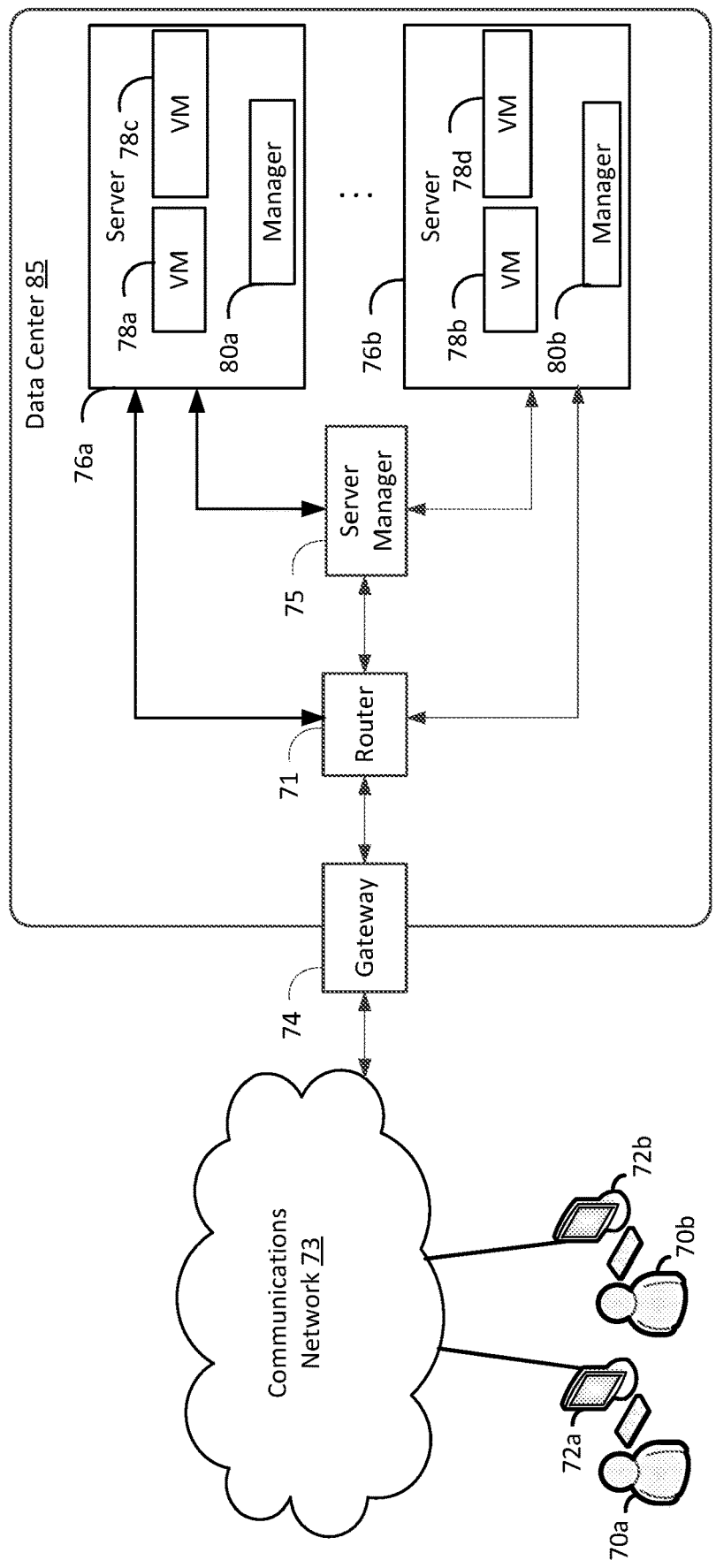
FIG. 15 is a diagram illustrating an example system for transmitting and providing data that may be used in accordance with the present disclosure.

An example system for transmitting and providing data will now be described in detail. In particular, FIG. 15 illustrates an example computing environment in which the embodiments described herein may be implemented. FIG. 15 is a diagram schematically illustrating an example of a data center 85 that can provide computing resources to users 70*a* and 70*b* (which may be referred herein singularly as user 70 or in the plural as users 70) via user computers 72*a* and 72*b* (which may be referred herein singularly as computer 72 or in the plural as computers 72) via a communications network 73. Data center 85 may be configured to provide computing resources for executing applications on a permanent or an as-needed basis. The computing resources provided by data center 85 may include various types of resources, such as gateway resources, load balancing resources, routing resources, networking resources, computing resources, volatile and non-volatile memory resources, content delivery resources, data processing resources, data storage resources, data communication resources and the like. Each type of computing resource may be available in a number of specific configurations. For example, data processing resources may be available as virtual machine instances that may be configured to provide various web services. In addition, combinations of resources may be made available via a network and may be configured as one or more web services. The instances may be configured to execute applications, including web services, such as application services, media services, database services, processing services, gateway services, storage services, routing services, security services, encryption services, load balancing services, application services and the like. These services may be configurable with set or custom applications and may be configurable in size, execution, cost, latency, type, duration, accessibility and in any other dimension. These web services may be configured as available infrastructure for one or more clients and can include one or more applications configured as a platform or as software for one or more clients. These web services may be made available via one or more communications protocols. These communications protocols may include, for example, hypertext transfer protocol (HTTP) or non-HTTP protocols. These communications protocols may also include, for example, more reliable transport layer protocols, such as transmission control protocol (TCP), and less reliable transport layer protocols, such as user datagram protocol (UDP). Data storage resources may include file storage devices, block storage devices and the like.

Each type or configuration of computing resource may be available in different sizes, such as large resources—consisting of many processors, large amounts of memory and/or large storage capacity—and small resources—consisting of fewer processors, smaller amounts of memory and/or smaller storage capacity. Customers may choose to allocate a number of small processing resources as web servers and/or one large processing resource as a database server, for example.

Data center 85 may include servers 76*a* and 76*b* (which may be referred herein singularly as server 76 or in the plural as servers 76) that provide computing resources. These resources may be available as bare metal resources or as virtual machine instances 78*a-d* (which may be referred herein singularly as virtual machine instance 78 or in the plural as virtual machine instances 78).

The availability of virtualization technologies for computing hardware has afforded benefits for providing large scale computing resources for customers and allowing computing resources to be efficiently and securely shared between multiple customers. For example, virtualization technologies may allow a physical computing device to be shared among multiple users by providing each user with one or more virtual machine instances hosted by the physical computing device. A virtual machine instance may be a software emulation of a particular physical computing system that acts as a distinct logical computing system. Such a virtual machine instance provides isolation among multiple operating systems sharing a given physical computing resource. Furthermore, some virtualization technologies may provide virtual resources that span one or more physical resources, such as a single virtual machine instance with multiple virtual processors that span multiple distinct physical computing systems.

Referring to FIG. 15, communications network 73 may, for example, be a publicly accessible network of linked networks and possibly operated by various distinct parties, such as the Internet. In other embodiments, communications network 73 may be a private network, such as a corporate or university network that is wholly or partially inaccessible to non-privileged users. In still other embodiments, communications network 73 may include one or more private networks with access to and/or from the Internet.

Communication network 73 may provide access to computers 72. User computers 72 may be computers utilized by users 70 or other customers of data center 85. For instance, user computer 72a or 72b may be a server, a desktop or laptop personal computer, a tablet computer, a wireless telephone, a personal digital assistant (PDA), an e-book reader, a game console, a set-top box or any other computing device capable of accessing data center 85. User computer 72a or 72b may connect directly to the Internet (e.g., via a cable modem or a Digital Subscriber Line (DSL)). Although only two user computers 72a and 72b are depicted, it should be appreciated that there may be multiple user computers.

User computers 72 may also be utilized to configure aspects of the computing resources provided by data center 85. In this regard, data center 85 might provide a gateway or web interface through which aspects of its operation may be configured through the use of a web browser application program executing on user computer 72. Alternately, a stand-alone application program executing on user computer 72 might access an application programming interface (API) exposed by data center 85 for performing the configuration operations. Other mechanisms for configuring the operation of various web services available at data center 85 might also be utilized.

Servers 76 shown in FIG. 15 may be servers configured appropriately for providing the computing resources described above and may provide computing resources for executing one or more web services and/or applications. In one embodiment, the computing resources may be virtual machine instances 78. In the example of virtual machine instances, each of the servers 76 may be configured to execute an instance manager 80a or 80b (which may be referred herein singularly as instance manager 80 or in the plural as instance managers 80) capable of executing the virtual machine instances 78. The instance managers 80 may be a virtual machine monitor (VMM) or another type of program configured to enable the execution of virtual machine instances 78 on server 76, for example. As discussed above, each of the virtual machine instances 78 may be configured to execute all or a portion of an application.

It should be appreciated that although the embodiments disclosed above discuss the context of virtual machine instances, other types of implementations can be utilized with the concepts and technologies disclosed herein. For example, the embodiments disclosed herein might also be utilized with computing systems that do not utilize virtual machine instances.

In the example data center 85 shown in FIG. 15, a router 71 may be utilized to interconnect the servers 76a and 76b. Router 71 may also be connected to gateway 74, which is connected to communications network 73. Router 71 may be connected to one or more load balancers, and alone or in combination may manage communications within networks in data center 85, for example, by forwarding packets or other data communications as appropriate based on characteristics of such communications (e.g., header information including source and/or destination addresses, protocol identifiers, size, processing requirements, etc.) and/or the characteristics of the private network (e.g., routes based on network topology, etc.). It will be appreciated that, for the sake of simplicity, various aspects of the computing systems and other devices of this example are illustrated without showing certain conventional details. Additional computing systems and other devices may be interconnected in other embodiments and may be interconnected in different ways.

In the example data center 85 shown in FIG. 15, a server manager 75 is also employed to at least in part direct various communications to, from and/or between servers 76a and 76b. While FIG. 15 depicts router 71 positioned between gateway 74 and server manager 75, this is merely an exemplary configuration. In some cases, for example, server manager 75 may be positioned between gateway 74 and router 71. Server manager 75 may, in some cases, examine portions of incoming communications from user computers 72 to determine one or more appropriate servers 76 to receive and/or process the incoming communications. Server manager 75 may determine appropriate servers to receive and/or process the incoming communications based on factors such as an identity, location or other attributes associated with user computers 72, a nature of a task with which the communications are associated, a priority of a task with which the communications are associated, a duration of a task with which the communications are associated, a size and/or estimated resource usage of a task with which the communications are associated and many other factors. Server manager 75 may, for example, collect or otherwise have access to state information and other information associated with various tasks in order to, for example, assist in managing communications and other operations associated with such tasks.

It should be appreciated that the network topology illustrated in FIG. 15 has been greatly simplified and that many more networks and networking devices may be utilized to interconnect the various computing systems disclosed herein. These network topologies and devices should be apparent to those skilled in the art.

It should also be appreciated that data center 85 described in FIG. 15 is merely illustrative and that other implementations might be utilized. It should also be appreciated that a server, gateway or other computing device may comprise any combination of hardware or software that can interact and perform the described types of functionality, including without limitation: desktop or other computers, database servers, network storage devices and other network devices, PDAs, tablets, cellphones, wireless phones, pagers, electronic organizers, Internet appliances, television-based systems (e.g., using set top boxes and/or personal/digital video recorders) and various other consumer products that include appropriate communication capabilities.

Figure 16:
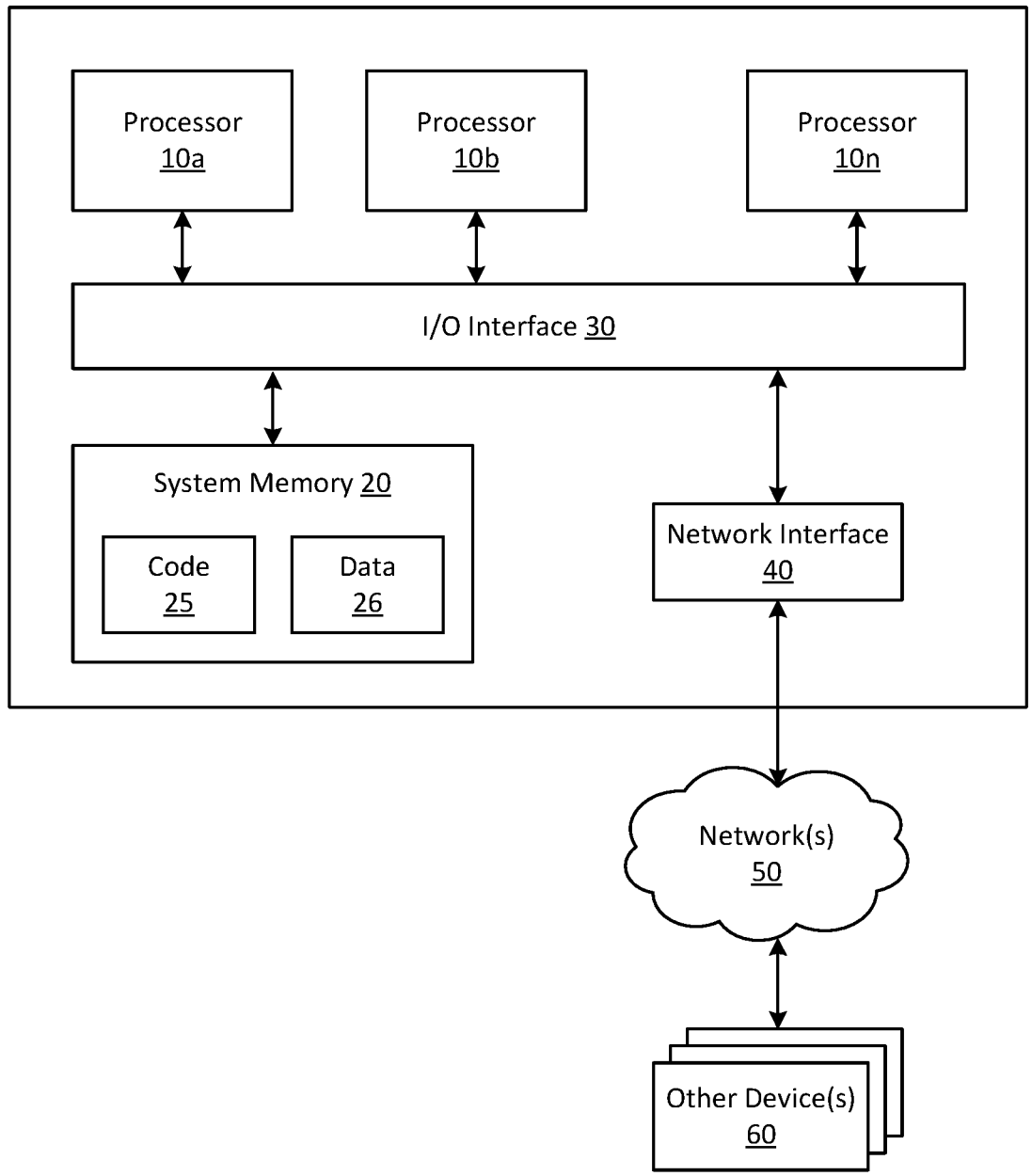
FIG. 16 is a diagram illustrating an example computing system that may be used in accordance with the present disclosure.

In at least some embodiments, a server that implements a portion or all of one or more of the technologies described herein may include a computer system that includes or is configured to access one or more computer-accessible media. FIG. 16 depicts a computer system that includes or is configured to access one or more computer-accessible media. In the illustrated embodiment, computing device 15 includes one or more processors 10a, 10b and/or 10n (which may be referred herein singularly as "a processor 10" or in the plural as "the processors 10") coupled to a system memory 20 via an input/output (I/O) interface 30. Computing device 15 further includes a network interface 40 coupled to I/O interface 30.

In various embodiments, computing device 15 may be a uniprocessor system including one processor 10 or a multiprocessor system including several processors 10 (e.g., two, four, eight or another suitable number). Processors 10 may be any suitable processors capable of executing instructions. For example, in various embodiments, processors 10 may be embedded processors implementing any of a variety of instruction set architectures (ISAs), such as the x86, PowerPC, SPARC or MIPS ISAs or any other suitable ISA. In multiprocessor systems, each of processors 10 may commonly, but not necessarily, implement the same ISA.

System memory 20 may be configured to store instructions and data accessible by processor(s) 10. In various embodiments, system memory 20 may be implemented using any suitable memory technology, such as static random access memory (SRAM), synchronous dynamic RAM (SDRAM), nonvolatile/Flash®-type memory or any other type of memory. In the illustrated embodiment, program instructions and data implementing one or more desired functions, such as those methods, techniques and data described above, are shown stored within system memory 20 as code 25 and data 26.

In one embodiment, I/O interface 30 may be configured to coordinate I/O traffic between processor 10, system memory 20 and any peripherals in the device, including network interface 40 or other peripheral interfaces. In some embodiments, I/O interface 30 may perform any necessary protocol, timing or other data transformations to convert data signals from one component (e.g., system memory 20) into a format suitable for use by another component (e.g., processor 10). In some embodiments, I/O interface 30 may include support for devices attached through various types of peripheral buses, such as a variant of the Peripheral Component Interconnect (PCI) bus standard or the Universal Serial Bus (USB) standard, for example. In some embodiments, the function of I/O interface 30 may be split into two or more separate components, such as a north bridge and a south bridge, for example. Also, in some embodiments some or all of the functionality of I/O interface 30, such as an interface to system memory 20, may be incorporated directly into processor 10.

Network interface 40 may be configured to allow data to be exchanged between computing device 15 and other device or devices 60 attached to a network or networks 50, such as other computer systems or devices, for example. In various embodiments, network interface 40 may support communication via any suitable wired or wireless general data networks, such as types of Ethernet networks, for example. Additionally, network interface 40 may support communication via telecommunications/telephony networks, such as analog voice networks or digital fiber communications networks, via storage area networks such as Fibre Channel SANs (storage area networks) or via any other suitable type of network and/or protocol.

In some embodiments, system memory 20 may be one embodiment of a computer-accessible medium configured to store program instructions and data as described above for implementing embodiments of the corresponding methods and apparatus. However, in other embodiments, program instructions and/or data may be received, sent or stored upon different types of computer-accessible media. Generally speaking, a computer-accessible medium may include non-transitory storage media or memory media, such as magnetic or optical media—e.g., disk or DVD/CD coupled to computing device 15 via I/O interface 30. A non-transitory computer-accessible storage medium may also include any volatile or non-volatile media, such as RAM (e.g., SDRAM, DDR SDRAM, RDRAM, SRAM, etc.), ROM (read only memory) etc., that may be included in some embodiments of computing device 15 as system memory 20 or another type of memory. Further, a computer-accessible medium may include transmission media or signals such as electrical, electromagnetic or digital signals conveyed via a communication medium, such as a network and/or a wireless link, such as those that may be implemented via network interface 40.

A network set up by an entity, such as a company or a public sector organization, to provide one or more web services (such as various types of cloud-based computing or storage) accessible via the Internet and/or other networks to a distributed set of clients may be termed a provider network. Such a provider network may include numerous data centers hosting various resource pools, such as collections of physical and/or virtualized computer servers, storage devices, networking equipment and the like, needed to implement and distribute the infrastructure and web services offered by the provider network. The resources may in some embodiments be offered to clients in various units related to the web service, such as an amount of storage capacity for storage, processing capability for processing, as instances, as sets of related services and the like. A virtual computing instance may, for example, comprise one or more servers with a specified computational capacity (which may be specified by indicating the type and number of CPUs, the main memory size and so on) and a specified software stack (e.g., a particular version of an operating system, which may in turn run on top of a hypervisor).

A compute node, which may be referred to also as a computing node, may be implemented on a wide variety of computing environments, such as commodity-hardware computers, virtual machines, web services, computing clusters and computing appliances. Any of these computing devices or environments may, for convenience, be described as compute nodes.

A number of different types of computing devices may be used singly or in combination to implement the resources of the provider network in different embodiments, for example computer servers, storage devices, network devices and the like. In some embodiments a client or user may be provided direct access to a resource instance, e.g., by giving a user an administrator login and password. In other embodiments the provider network operator may allow clients to specify execution requirements for specified client applications and schedule execution of the applications on behalf of the client on execution platforms (such as application server instances, Java' virtual machines (JVMs), general-purpose or special-purpose operating systems, platforms that support various interpreted or compiled programming languages such as Ruby, Perl, Python, C, C++ and the like or high-performance computing platforms) suitable for the applications, without, for example, requiring the client to access an instance or an execution platform directly. A given execution platform may utilize one or more resource instances in some implementations; in other implementations, multiple execution platforms may be mapped to a single resource instance.

In many environments, operators of provider networks that implement different types of virtualized computing, storage and/or other network-accessible functionality may allow customers to reserve or purchase access to resources in various resource acquisition modes. The computing resource provider may provide facilities for customers to select and launch the desired computing resources, deploy application components to the computing resources and maintain an application executing in the environment. In addition, the computing resource provider may provide further facilities for the customer to quickly and easily scale up or scale down the numbers and types of resources allocated to the application, either manually or through automatic scaling, as demand for or capacity requirements of the application change. The computing resources provided by the computing resource provider may be made available in discrete units, which may be referred to as instances. An instance may represent a physical server hardware platform, a virtual machine instance executing on a server or some combination of the two. Various types and configurations of instances may be made available, including different sizes of resources executing different operating systems (OS) and/or hypervisors, and with various installed software applications, runtimes and the like. Instances may further be available in specific availability zones, representing a logical region, a fault tolerant region, a data center or other geographic location of the underlying computing hardware, for example. Instances may be copied within an availability zone or across availability zones to improve the redundancy of the instance, and instances may be migrated within a particular availability zone or across availability zones. As one example, the latency for client communications with a particular server in an availability zone may be less than the latency for client communications with a different server. As such, an instance may be migrated from the higher latency server to the lower latency server to improve the overall client experience.

In some embodiments the provider network may be organized into a plurality of geographical regions, and each region may include one or more availability zones. An availability zone (which may also be referred to as an availability container) in turn may comprise one or more distinct locations or data centers, configured in such a way that the resources in a given availability zone may be isolated or insulated from failures in other availability zones. That is, a failure in one availability zone may not be expected to result in a failure in any other availability zone. Thus, the availability profile of a resource instance is intended to be independent of the availability profile of a resource instance in a different availability zone. Clients may be able to protect their applications from failures at a single location by launching multiple application instances in respective availability zones. At the same time, in some implementations inexpensive and low latency network connectivity may be provided between resource instances that reside within the same geographical region (and network transmissions between resources of the same availability zone may be even faster).

As set forth above, content may be provided by a content provider to one or more clients. The term content, as used herein, refers to any presentable information, and the term content item, as used herein, refers to any collection of any such presentable information. A content provider may, for example, provide one or more content providing services for providing content to clients. The content providing services may reside on one or more servers. The content providing services may be scalable to meet the demands of one or more customers and may increase or decrease in capability based on the number and type of incoming client requests. Portions of content providing services may also be migrated to be placed in positions of reduced latency with requesting clients. For example, the content provider may determine an "edge" of a system or network associated with content providing services that is physically and/or logically closest to a particular client. The content provider may then, for example, "spin-up," migrate resources or otherwise employ components associated with the determined edge for interacting with the particular client. Such an edge determination process may, in some cases, provide an efficient technique for identifying and employing components that are well suited to interact with a particular client, and may, in some embodiments, reduce the latency for communications between a content provider and one or more clients.

In addition, certain methods or process blocks may be omitted in some implementations. The methods and processes described herein are also not limited to any particular sequence, and the blocks or states relating thereto can be performed in other sequences that are appropriate. For example, described blocks or states may be performed in an order other than that specifically disclosed, or multiple blocks or states may be combined in a single block or state. The example blocks or states may be performed in serial, in parallel or in some other manner. Blocks or states may be added to or removed from the disclosed example embodiments.

It will also be appreciated that various items are illustrated as being stored in memory or on storage while being used, and that these items or portions thereof may be transferred between memory and other storage devices for purposes of memory management and data integrity. Alternatively, in other embodiments some or all of the software modules and/or systems may execute in memory on another device and communicate with the illustrated computing systems via inter-computer communication. Furthermore, in some embodiments, some or all of the systems and/or modules may be implemented or provided in other ways, such as at least partially in firmware and/or hardware, including, but not limited to, one or more application-specific integrated circuits (ASICs), standard integrated circuits, controllers (e.g., by executing appropriate instructions, and including microcontrollers and/or embedded controllers), field-programmable gate arrays (FPGAs), complex programmable logic devices (CPLDs), etc. Some or all of the modules, systems and data structures may also be stored (e.g., as software instructions or structured data) on a computer-readable medium, such as a hard disk, a memory, a network or a portable media article to be read by an appropriate drive or via an appropriate connection. The systems, modules and data structures may also be transmitted as generated data signals (e.g., as part of a carrier wave or other analog or digital propagated signal) on a variety of computer-readable transmission media, including wireless-based and wired/cable-based media, and may take a variety of forms (e.g., as part of a single or multiplexed analog signal, or as multiple discrete digital packets or frames). Such computer program products may also take other forms in other embodiments. Accordingly, the present invention may be practiced with other computer system configurations.

Conditional language used herein, such as, among others, "can," "could," "might," "may," "e.g." and the like, unless specifically stated otherwise, or otherwise understood within the context as used, is generally intended to convey that certain embodiments include, while other embodiments do not include, certain features, elements, and/or steps. Thus, such conditional language is not generally intended to imply that features, elements and/or steps are in any way required for one or more embodiments or that one or more embodiments necessarily include logic for deciding, with or without author input or prompting, whether these features, elements and/or steps are included or are to be performed in any particular embodiment. The terms "comprising," "including," "having" and the like are synonymous and are used inclusively, in an open-ended fashion, and do not exclude additional elements, features, acts, operations and so forth. Also, the term "or" is used in its inclusive sense (and not in its exclusive sense) so that when used, for example, to connect a list of elements, the term "or" means one, some or all of the elements in the list.

While certain example embodiments have been described, these embodiments have been presented by way of example only and are not intended to limit the scope of the inventions disclosed herein. Thus, nothing in the foregoing description is intended to imply that any particular feature, characteristic, step, module or block is necessary or indispensable. Indeed, the novel methods and systems described herein may be embodied in a variety of other forms; furthermore, various omissions, substitutions and changes in the form of the methods and systems described herein may be made without departing from the spirit of the inventions disclosed herein. The accompanying claims and their equivalents are intended to cover such forms or modifications as would fall within the scope and spirit of certain of the inventions disclosed herein.

What is claimed is:

1. A computing system comprising:
one or more processors; and
one or more memories having stored therein computing instructions that, upon execution by the one or more processors, cause the computing system to perform operations comprising:
receiving one or more commands associated with a virtual surface for display in a streaming application, wherein the one or more commands indicate an animation that performs a movement in the virtual surface, and wherein the one or more commands include a relative width that is relative to a total width for the virtual surface in its entirety and a relative height that is relative to a total height for the virtual surface in its entirety;
generating, based on the one or more commands, rendering instructions for rendering the virtual surface including the animation in a user interface of the streaming application; and
providing the rendering instructions to one or more rendering components that render the virtual surface including the animation in the user interface based on the rendering instructions, wherein the relative width and the relative height indicate a first position at which the movement of the animation is at least one of started, stopped, or redirected.

2. The computing system of claim 1, wherein the relative width is expressed as a mathematical function with respect to the total width.

3. The computing system of claim 2, wherein the mathematical function is a percentage, a ratio, or a fraction of the total width.

4. A computer-implemented method comprising:
receiving one or more commands associated with a virtual surface for display in an application, wherein the one or more commands indicate an animation that performs a movement in the virtual surface, and wherein the one or more commands identify a first relative amount of a first positional attribute that is relative to a first total amount of the first positional attribute for the virtual surface in its entirety;
generating, based on the one or more commands, rendering instructions for rendering the virtual surface including the animation in a user interface of the application; and
providing the rendering instructions to one or more rendering components that render the virtual surface including the animation in the user interface based on the rendering instructions, wherein the first relative amount indicates a first position at which the movement of the animation is at least one of started, stopped, or redirected.

5. The computer-implemented method of claim 4, wherein the first positional attribute is width and the first relative amount is a relative width that is relative to a total width of the virtual surface in its entirety.

6. The computer-implemented method of claim 4, wherein the first positional attribute is height and the first relative amount is a relative height that is relative to a total height of the virtual surface in its entirety.

7. The computer-implemented method of claim 4, wherein the first position is further indicated based in part on a second relative amount of a second positional attribute that is relative to a second total amount of the second positional attribute for the virtual surface in its entirety.

8. The computer-implemented method of claim 7:
wherein the first positional attribute is width and the first relative amount is a relative width that is relative to a total width of the virtual surface in its entirety, and
wherein the second positional attribute is height and the second relative amount is a relative height that is relative to a total height of the virtual surface in its entirety.

9. The computer-implemented method of claim 4, wherein the first relative amount is expressed as a mathematical function with respect to the first total amount.

10. The computer-implemented method of claim 9, wherein the mathematical function is a percentage, a ratio, or a fraction of the first total amount.

11. The computer-implemented method of claim 4, wherein the one or more commands further indicate at least one of a duration, a repetition, or a delay associated with the animation.

12. One or more non-transitory computer-readable storage media having stored thereon computing instructions that, upon execution by a computing device, cause the computing device to perform operations comprising:
receiving one or more commands associated with a virtual surface for display in an application, wherein the one or more commands indicate an animation that performs a movement in the virtual surface, and wherein the one or more commands identify a first relative amount of a first positional attribute that is relative to a first total amount of the first positional attribute for the virtual surface in its entirety;
generating, based on the one or more commands, rendering instructions for rendering the virtual surface including the animation in a user interface of the application; and
providing the rendering instructions to one or more rendering components that render the virtual surface including the animation in the user interface based on the rendering instructions, wherein the first relative amount indicates a first position at which the movement of the animation is at least one of started, stopped, or redirected.

13. The one or more non-transitory computer-readable storage media of claim 12, wherein the first positional attribute is width and the first relative amount is a relative width that is relative to a total width of the virtual surface in its entirety.

14. The one or more non-transitory computer-readable storage media of claim 12, wherein the first positional attribute is height and the first relative amount is a relative height that is relative to a total height of the virtual surface in its entirety.

15. The one or more non-transitory computer-readable storage media of claim 12, wherein the first position is further indicated based in part on a second relative amount of a second positional attribute that is relative to a second total amount of the second positional attribute for the virtual surface in its entirety.

16. The one or more non-transitory computer-readable storage media of claim 15:
wherein the first positional attribute is width and the first relative amount is a relative width that is relative to a total width of the virtual surface in its entirety, and wherein the second positional attribute is height and the second relative amount is a relative height that is relative to a total height of the virtual surface in its entirety.

17. The one or more non-transitory computer-readable storage media of claim 12, wherein the first relative amount is a percentage, a ratio, or a fraction of the first total amount.

\* \* \* \* \*